US010274247B2

(12) United States Patent
Jeong et al.

(10) Patent No.: US 10,274,247 B2
(45) Date of Patent: Apr. 30, 2019

(54) REFRIGERATOR AND VACUUM INSULATION PANEL THEREOF

(71) Applicant: SAMSUNG ELECTRONICS CO., LTD., Suwon-si (KR)

(72) Inventors: Hyun Ku Jeong, Yongin-si (KR); Dae Hwan Kim, Seoul (KR); Keon Kuk, Yongin-si (KR); Jun O Kim, Yongin-si (KR); Choong Hyo Jang, Yuseong-gu (KR); Min Soo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/519,641

(22) PCT Filed: Sep. 30, 2015

(86) PCT No.: PCT/KR2015/010294
§ 371 (c)(1),
(2) Date: Apr. 17, 2017

(87) PCT Pub. No.: WO2016/060389
PCT Pub. Date: Apr. 21, 2016

(65) Prior Publication Data
US 2017/0370632 A1    Dec. 28, 2017

(30) Foreign Application Priority Data
Oct. 16, 2014   (KR) .................. 10-2014-0139822

(51) Int. Cl.
F25D 23/00        (2006.01)
F25D 23/06        (2006.01)

(52) U.S. Cl.
CPC ......... *F25D 23/065* (2013.01); *F25D 23/062* (2013.01); *F25D 23/063* (2013.01);
(Continued)

(58) Field of Classification Search
CPC .... F25D 23/067; F25D 23/064; F25D 23/066; F25D 23/10; F25D 25/02
(Continued)

(56) References Cited

U.S. PATENT DOCUMENTS 1,574,569 A  *  2/1926  Frazier ..................... F25D 3/04
                                                          312/406
2,275,365 A  *  3/1942  Hintze .................. F25D 23/062
                                                          220/592.09
(Continued)

FOREIGN PATENT DOCUMENTS

EP    1 335 171 A1    8/2003
EP    1338854    *    8/2003
(Continued)

OTHER PUBLICATIONS

International Search Report dated Feb. 1, 2016, in corresponding International Patent Application No. PCT/KR2015/010294.
(Continued)

*Primary Examiner* — Janet M Wilkens
(74) *Attorney, Agent, or Firm* — Staas & Halsey LLP

(57) ABSTRACT

Disclosed herein is a refrigerator having an inner case, a storage compartment formed in the inner case, an outer case provided outside the inner case, an inner frame coupled to an outer surface of the inner case to support the inner case, an outer frame coupled to an inner surface of the outer case to support the outer case, and a vacuum insulation panel provided between the inner case and the outer case to insulate the storage compartment and supported by the inner frame and the outer frame. The refrigerator can be assembled without foaming insulation and maintain rigidity.

13 Claims, 24 Drawing Sheets

(52) U.S. Cl.
CPC ......... *F25D 23/066* (2013.01); *F25D 23/067* (2013.01); *F25D 2201/14* (2013.01)

(58) Field of Classification Search
USPC .................. 312/401, 406, 406.2, 409, 116
See application file for complete search history.

(56) References Cited

U.S. PATENT DOCUMENTS

| | | | | | |
|---|---|---|---|---|---|
| 3,446,881 | A | * | 5/1969 | Poole | F25D 23/064 156/78 |
| 3,601,463 | A | * | 8/1971 | Watt | A47B 71/00 220/592.09 |
| 3,653,532 | A | * | 4/1972 | Mann | F25D 23/064 220/902 |
| 4,040,166 | A | * | 8/1977 | Morphy | F25D 23/064 220/592.1 |
| 5,171,079 | A | * | 12/1992 | Bayerle | A47B 81/00 312/400 |
| 6,106,449 | A | * | 8/2000 | Wynne | B29C 44/1266 493/101 |
| 7,913,511 | B2 | | 3/2011 | Meyer et al. | |
| 2009/0145050 | A1 | * | 6/2009 | Dugand | A47B 47/0041 52/36.1 |
| 2012/0103006 | A1 | * | 5/2012 | Jung | F25D 23/062 62/440 |
| 2012/0104923 | A1 | * | 5/2012 | Jung | F25D 23/066 312/406 |
| 2013/0088135 | A1 | * | 4/2013 | Kim | F25D 23/067 312/406 |
| 2013/0257256 | A1 | * | 10/2013 | Allard | F25D 23/062 312/406 |
| 2016/0109172 | A1 | * | 4/2016 | Kim | F25D 23/065 312/404 |
| 2017/0219273 | A1 | * | 8/2017 | Jung | F25D 23/062 |
| 2017/0292776 | A1 | * | 10/2017 | Kim | F25D 23/066 |
| 2018/0017314 | A1 | * | 1/2018 | Jeong | F25D 23/062 |

FOREIGN PATENT DOCUMENTS

| | | | |
|---|---|---|---|
| EP | 2447637 | * | 5/2012 |
| EP | 3 009 775 A1 | | 4/2016 |
| GB | 531521 | * | 1/1941 |
| JP | 8-61834 | | 3/1996 |
| KR | 10-2007-0052156 | | 5/2007 |
| KR | 10-2011-0015324 | | 2/2011 |
| KR | 10-2011-0028423 | | 3/2011 |
| KR | 10-2011-0065679 | | 6/2011 |
| KR | 10-2012-0044559 | | 5/2012 |
| WO | 2016105019 | * | 6/2016 |

OTHER PUBLICATIONS

International Written Opinion of the International Search Authority, PCT/ISA/237, dated Feb. 1, 2016, in corresponding International Patent Application No. PCT/KR2015/010294.
European Office Action dated Nov. 28, 2017, in corresponding European Patent Application No. 15 850 284.9.
European Search Report dated Oct. 17, 2017, in corresponding European Patent Application No. 15850284.9.
European Office Action dated Aug. 17, 2017, in corresponding European Patent Application No. 15 850 284.9.

* cited by examiner

[Fig. 1]
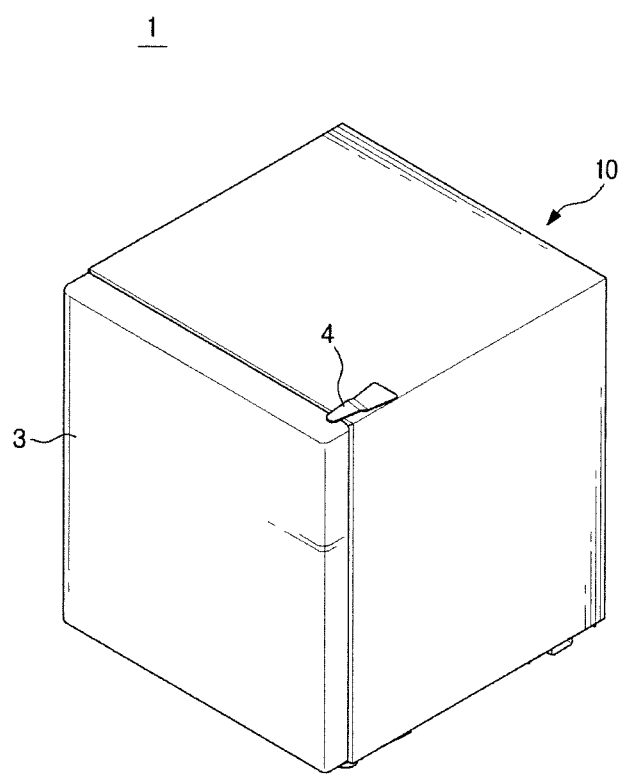

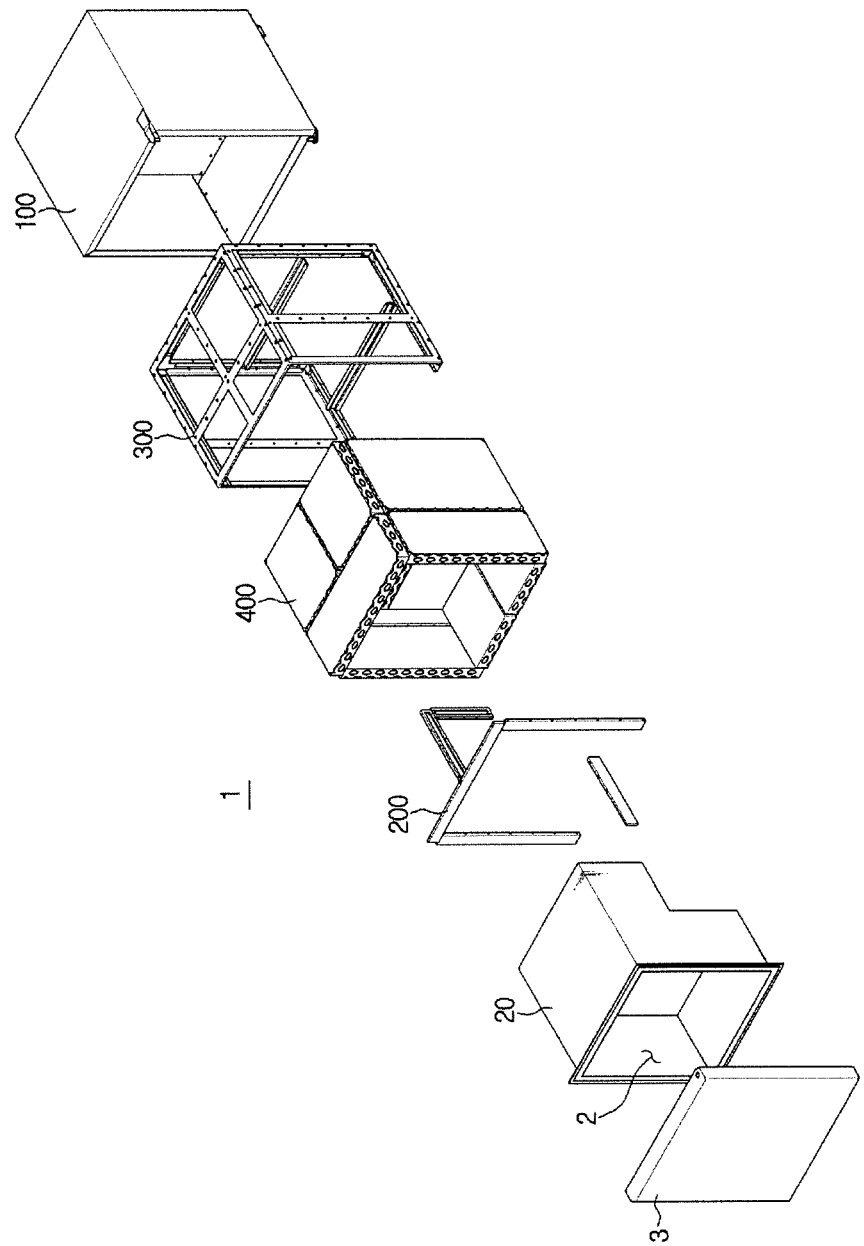
[Fig. 2]

[Fig. 3]
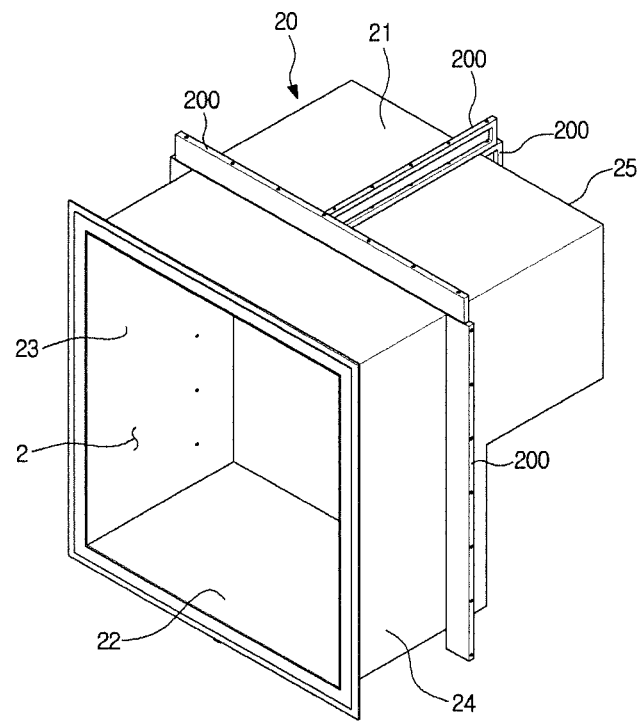
[Fig. 4]
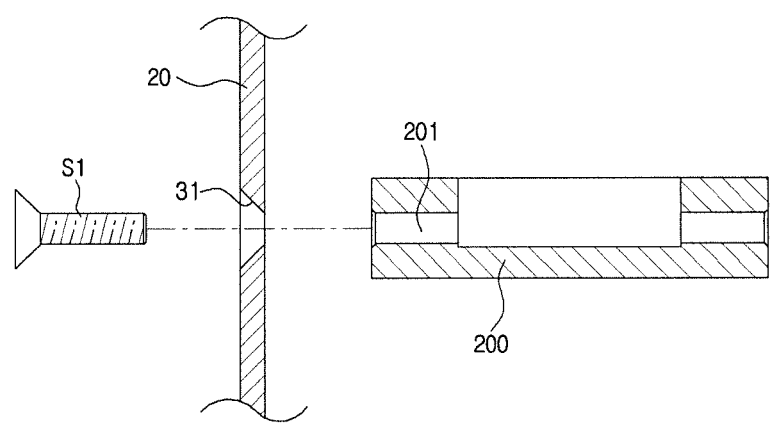

[Fig. 5]
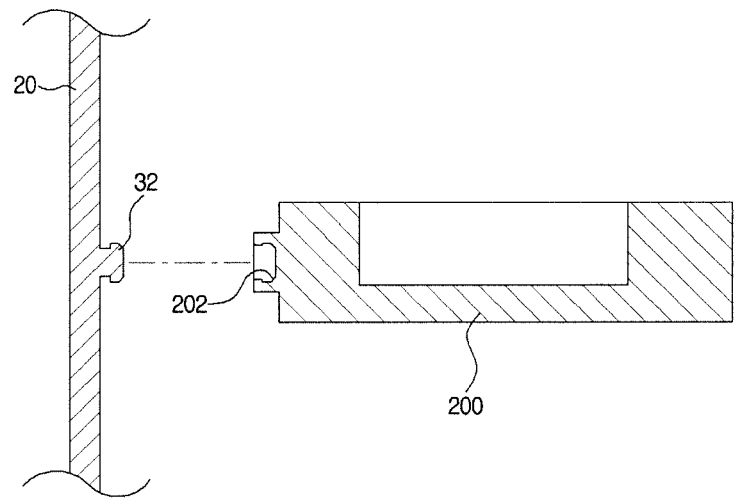
[Fig. 6]
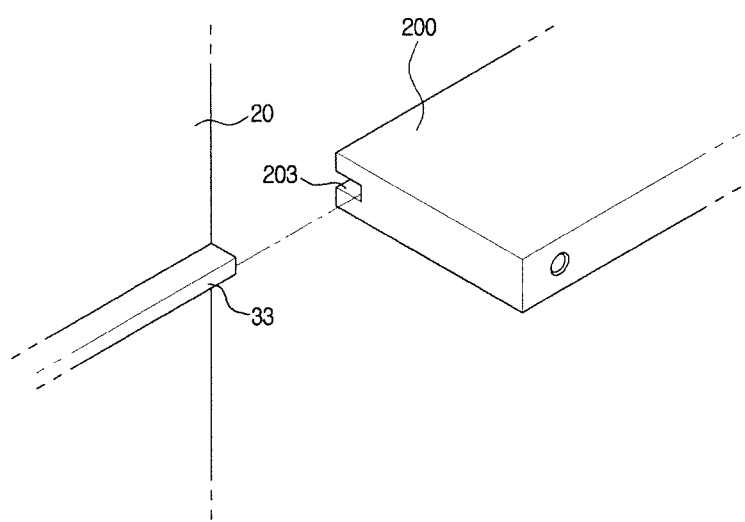

[Fig. 7]
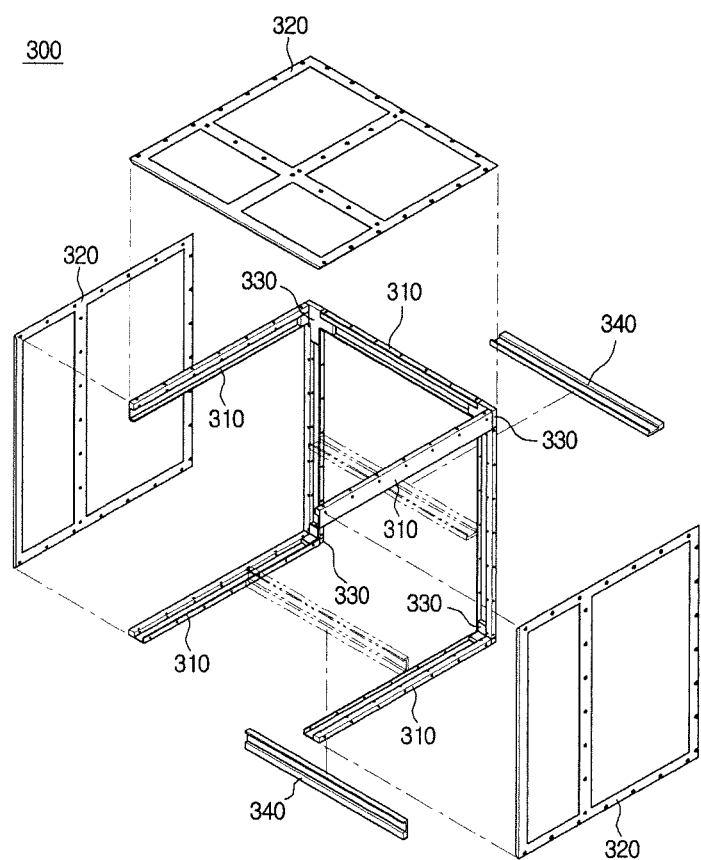

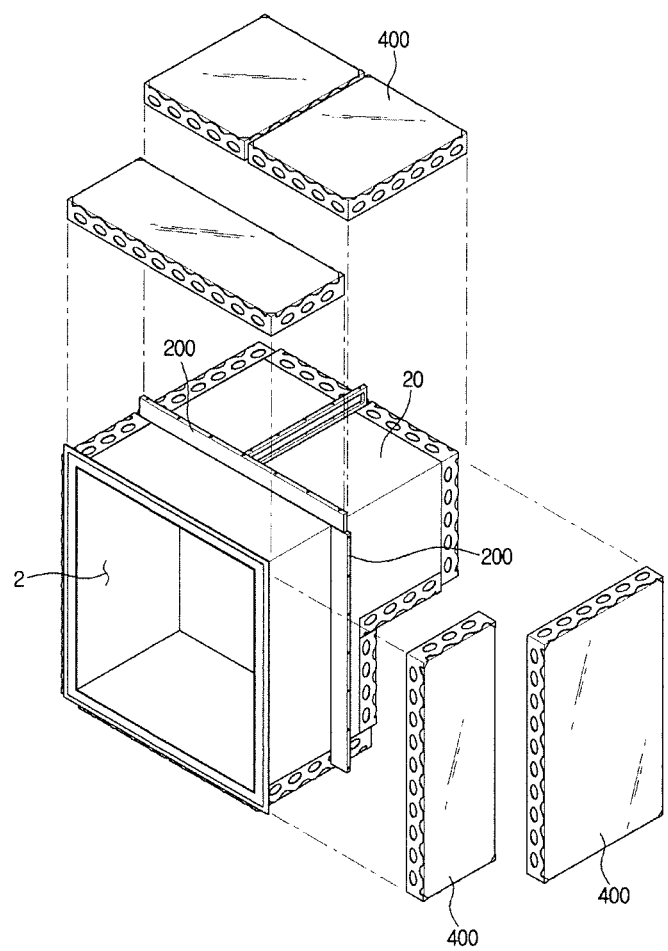
[Fig. 8]

[Fig. 9]
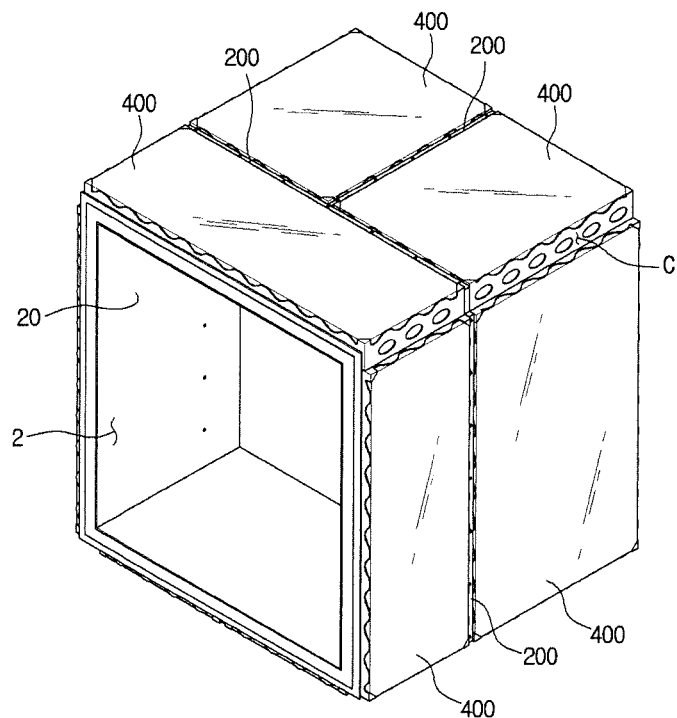
[Fig. 10]
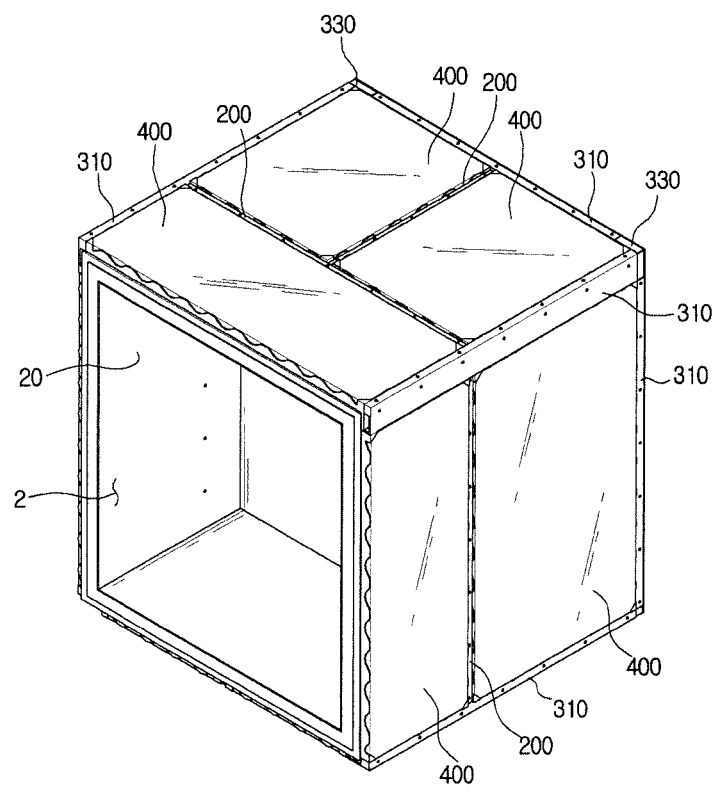

[Fig. 11]
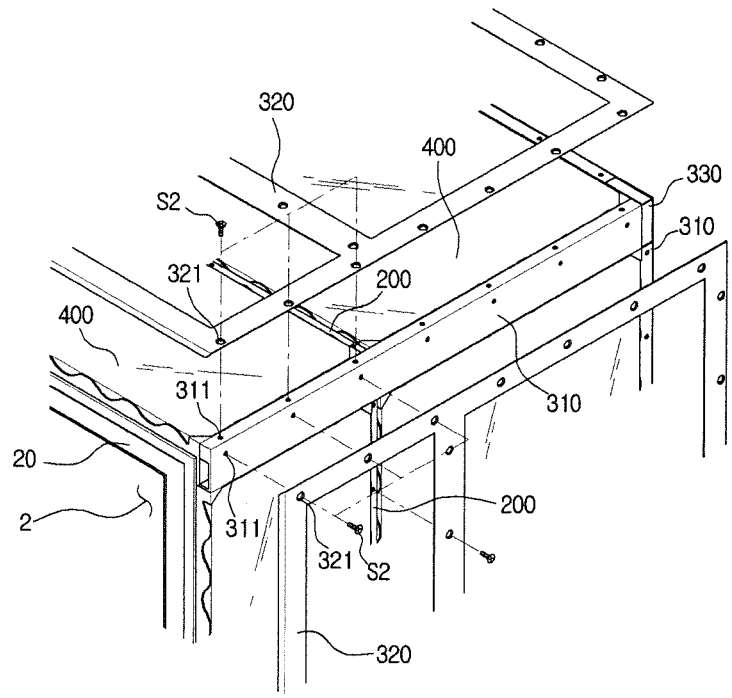
[Fig. 12]
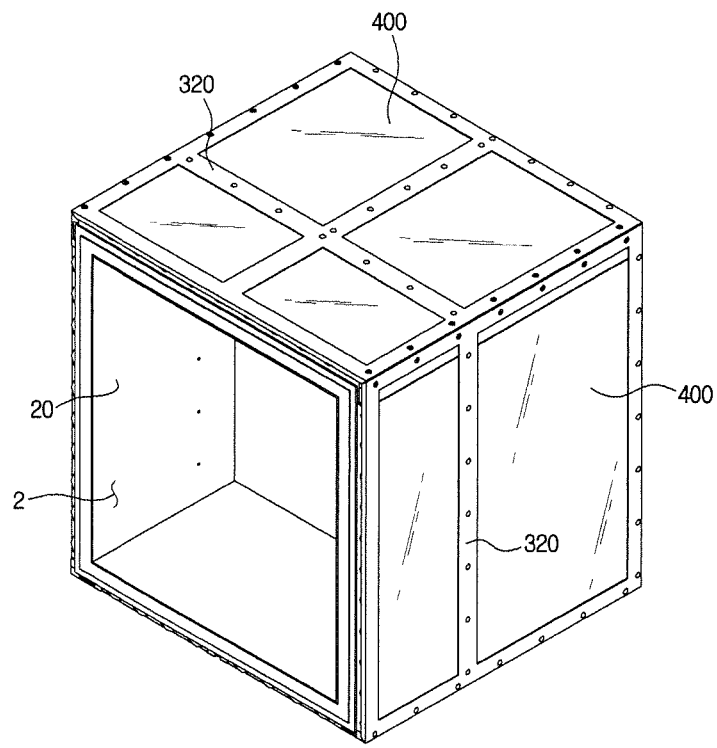

[Fig. 13]
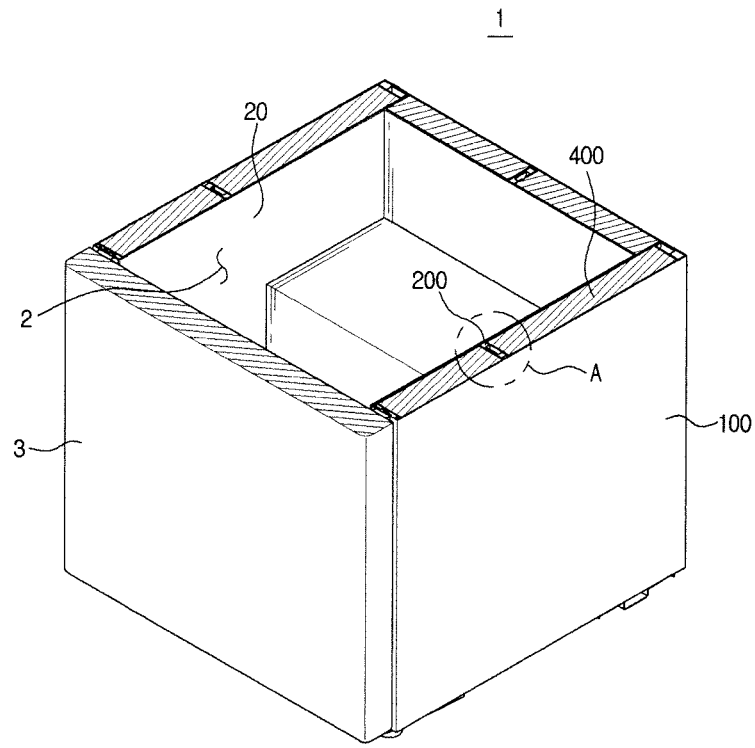
[Fig. 14]
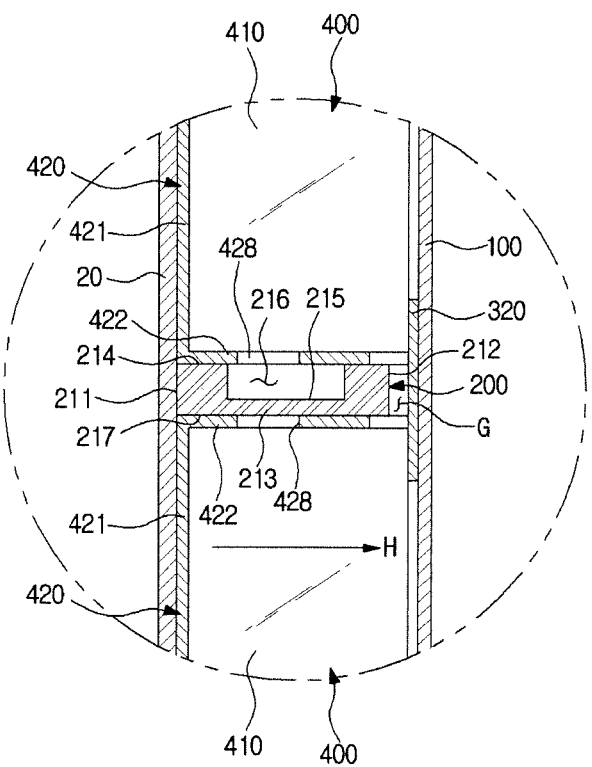

[Fig. 15]
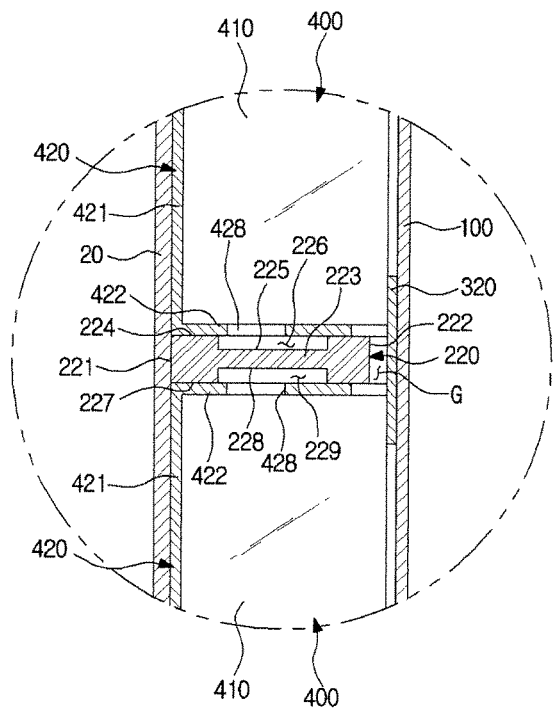
[Fig. 16]
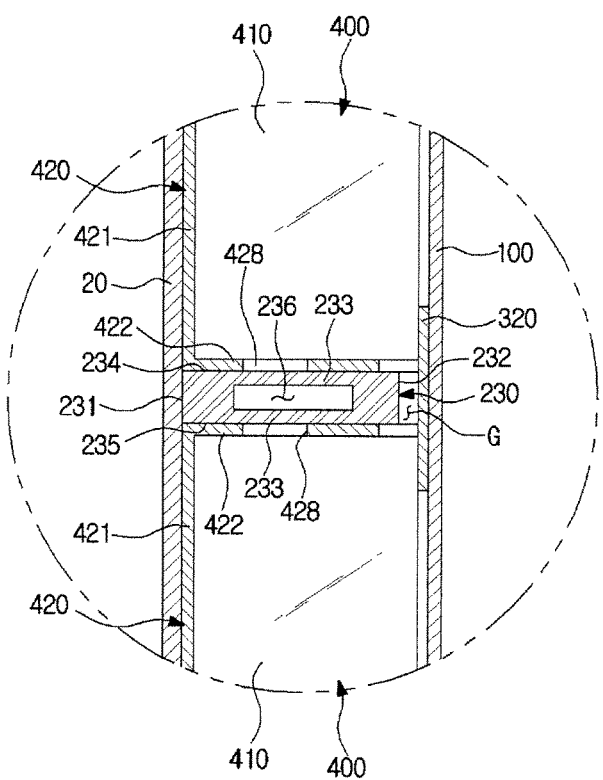

[Fig. 17]
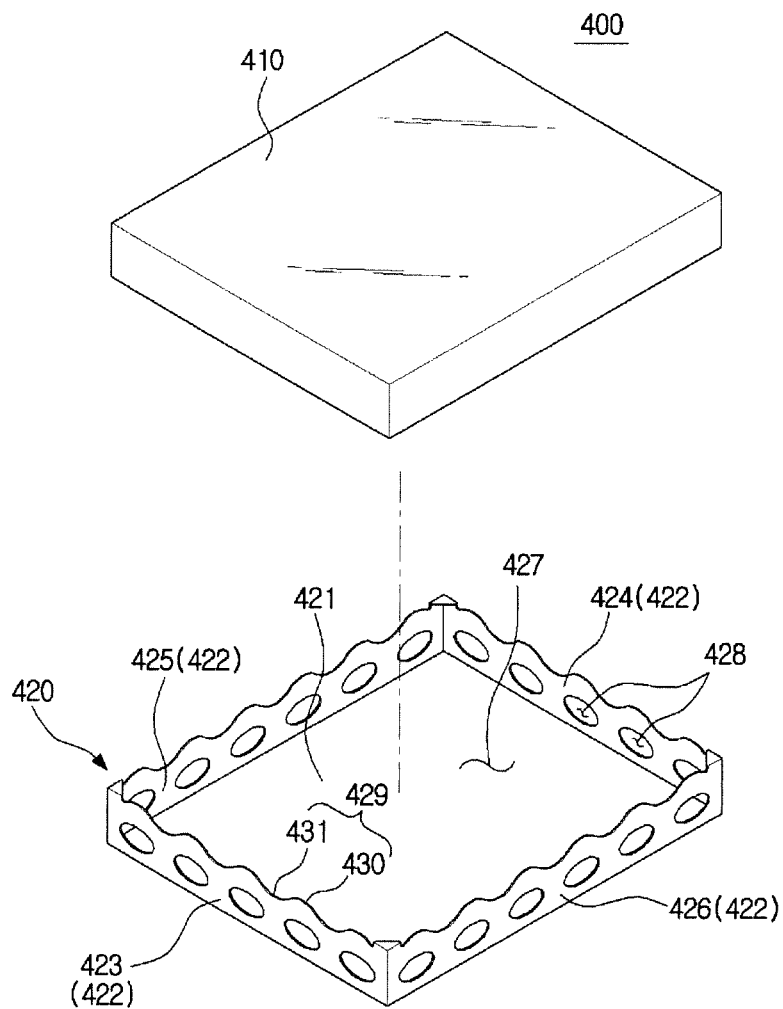
[Fig. 18]
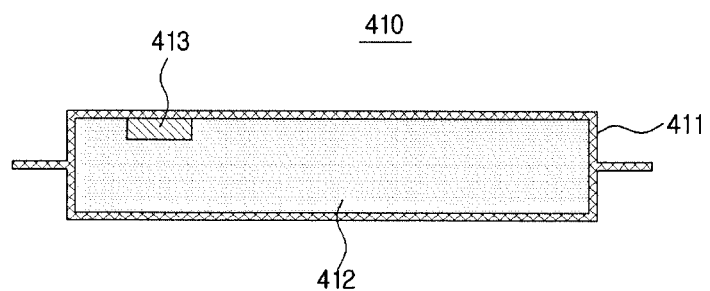

[Fig. 19]
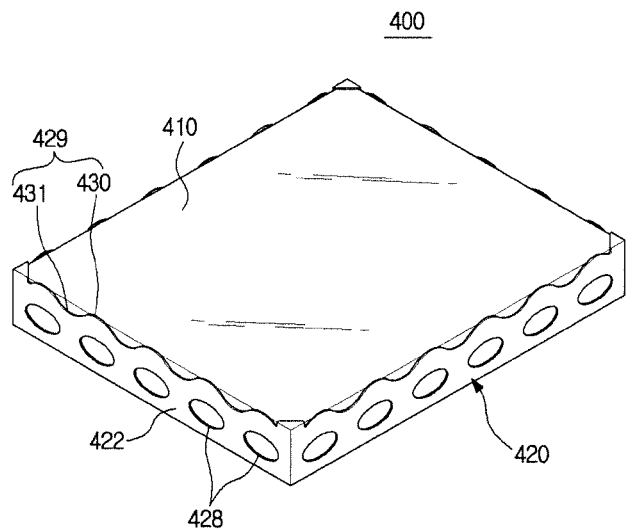
[Fig. 20]
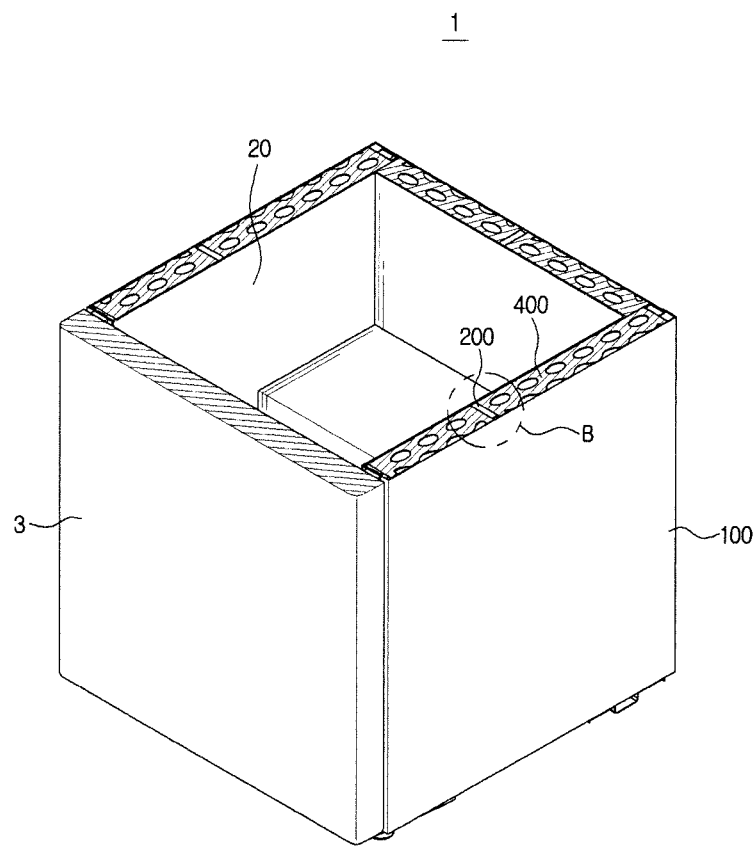

[Fig. 21]
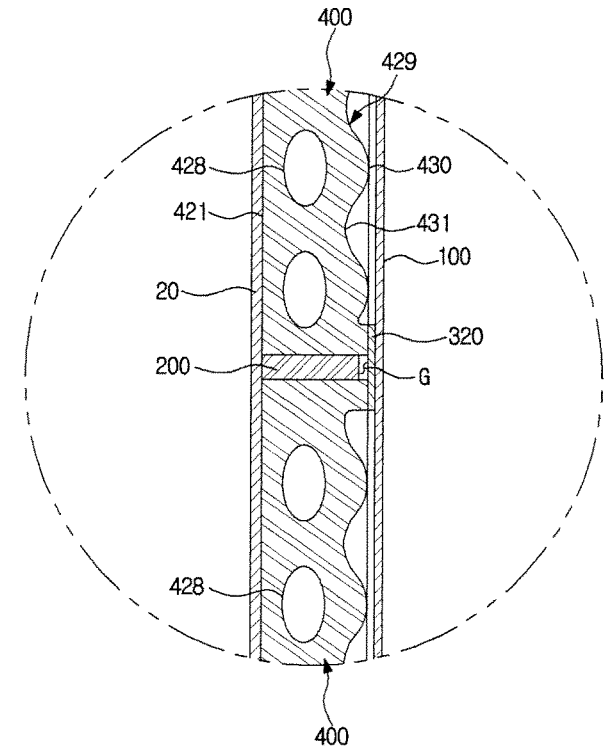
[Fig. 22]
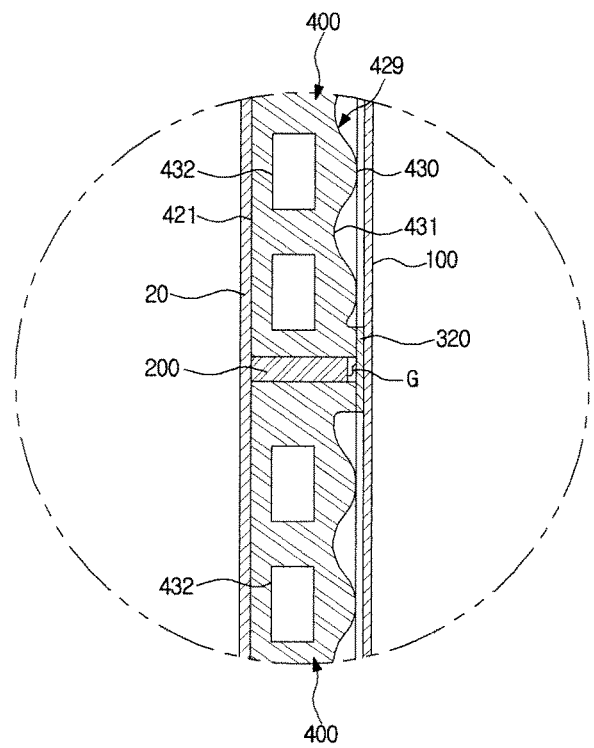

[Fig. 23]
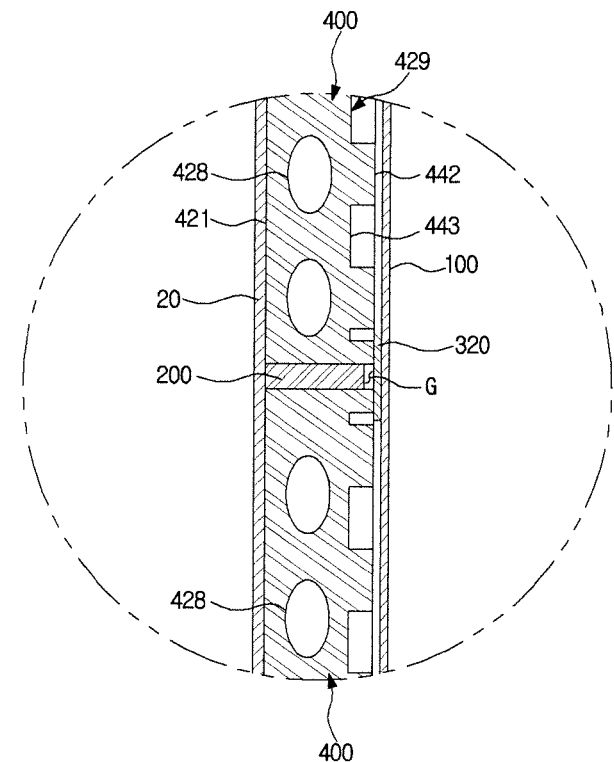
[Fig. 24]
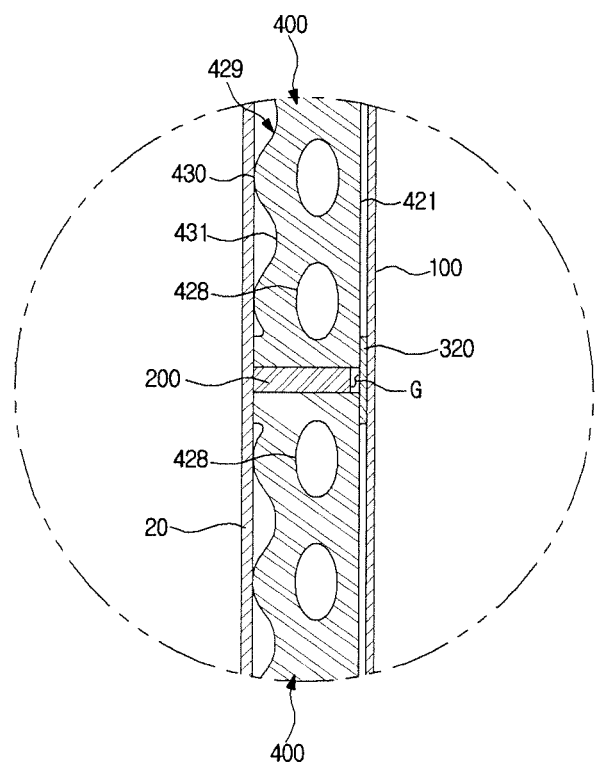

[Fig. 25]
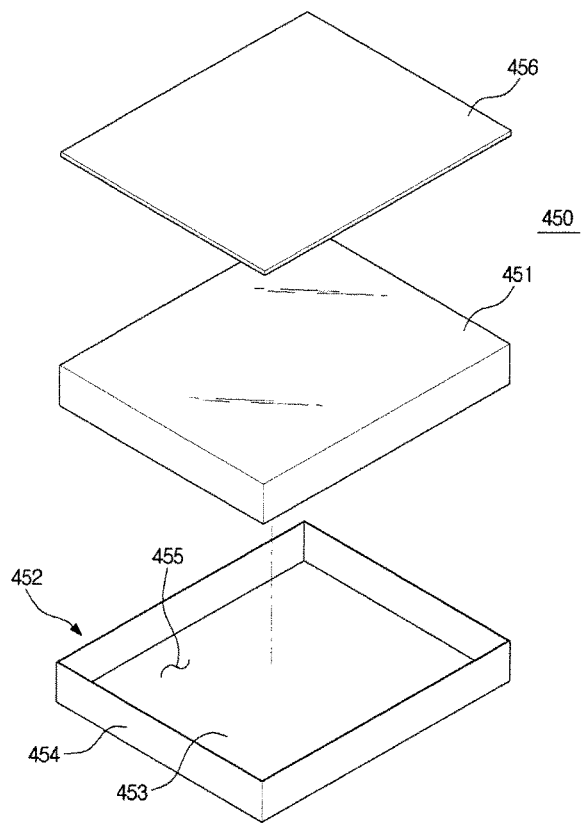
[Fig. 26]
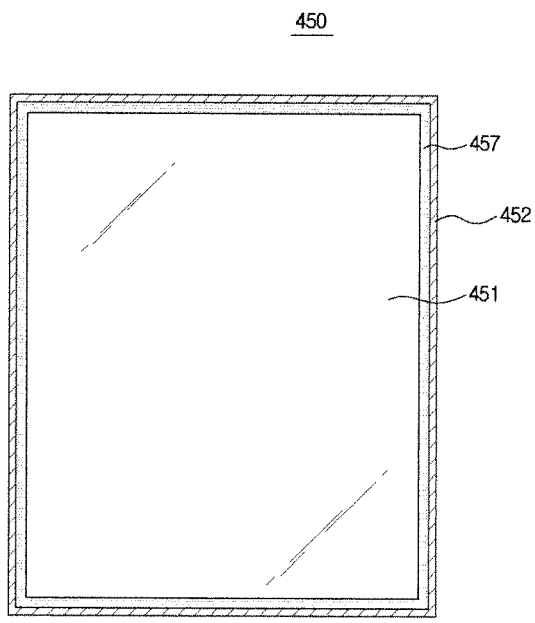

[Fig. 27]
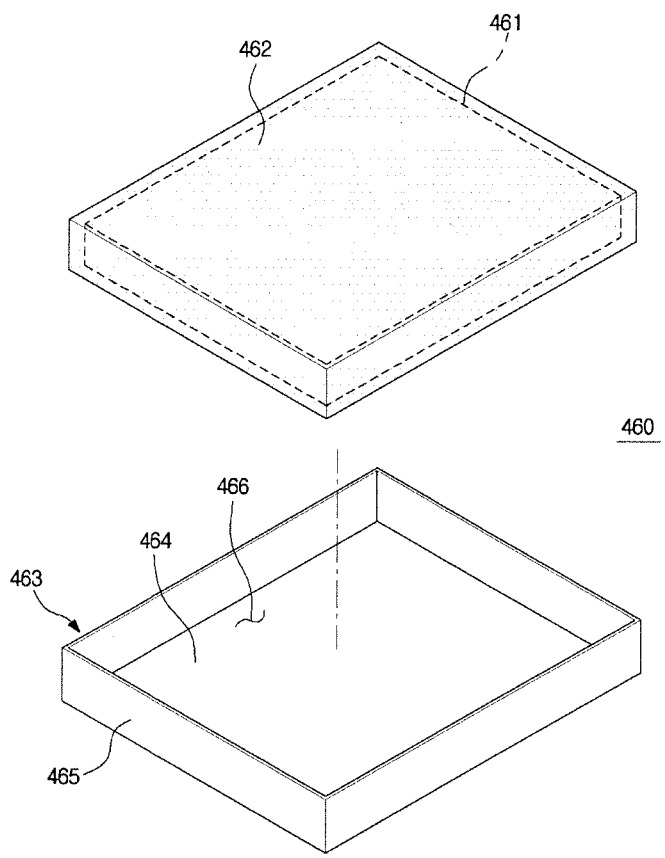

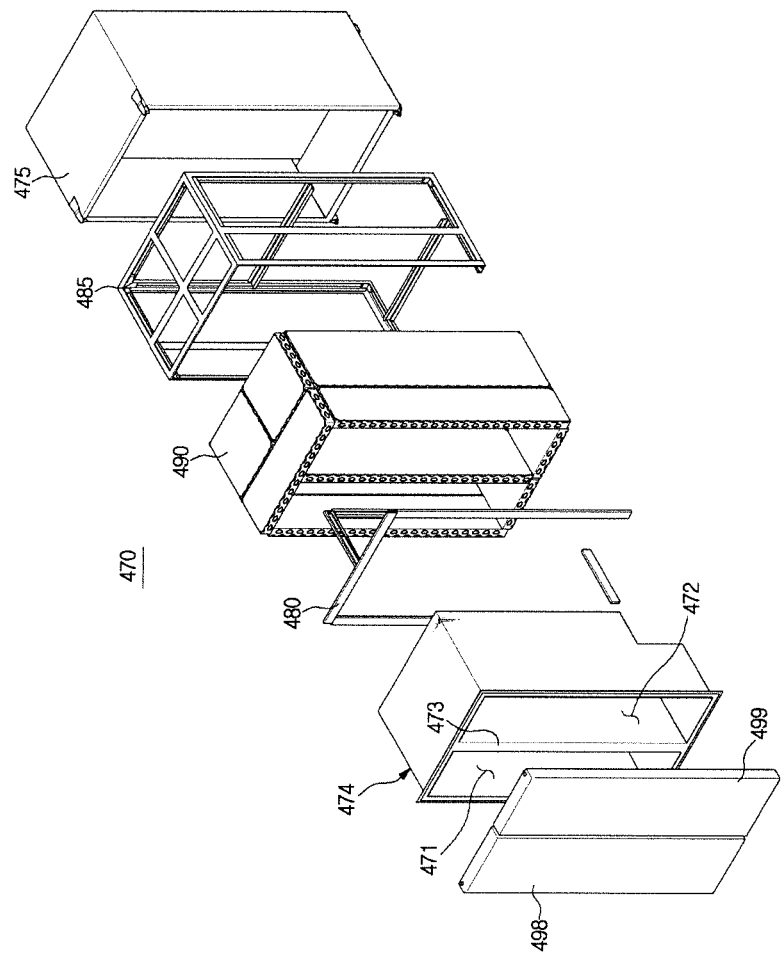
[Fig. 28]

[Fig. 29]
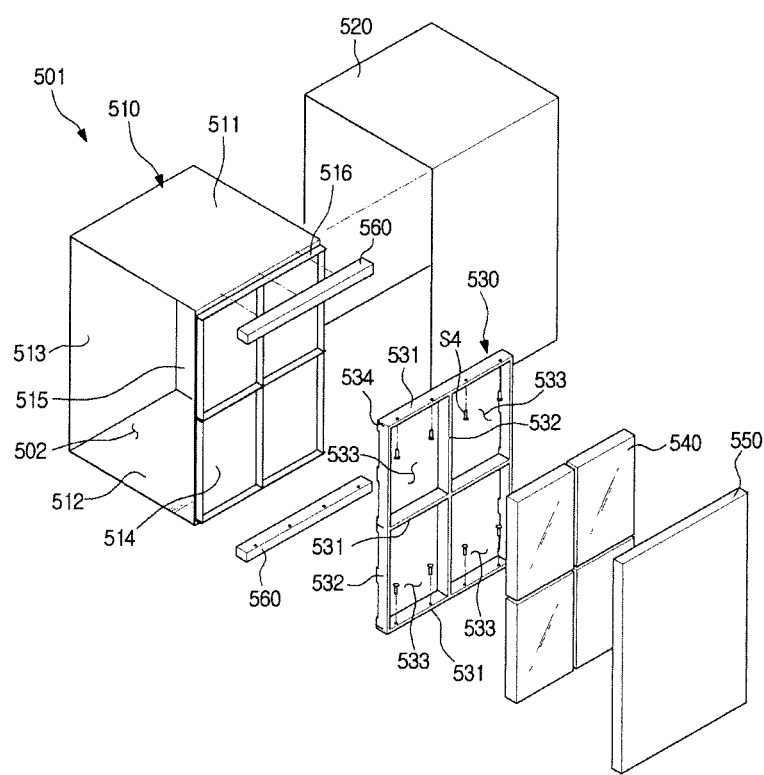

[Fig. 30]
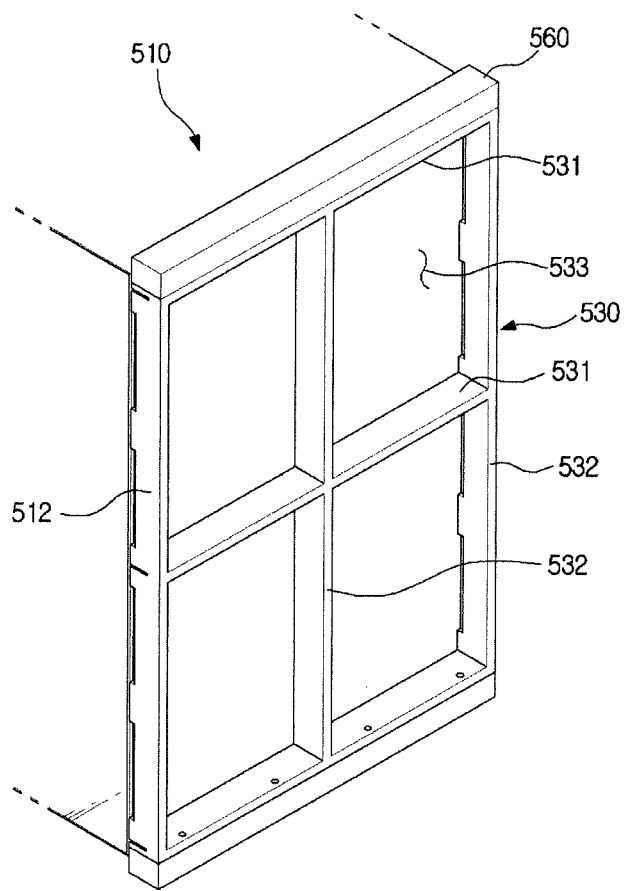

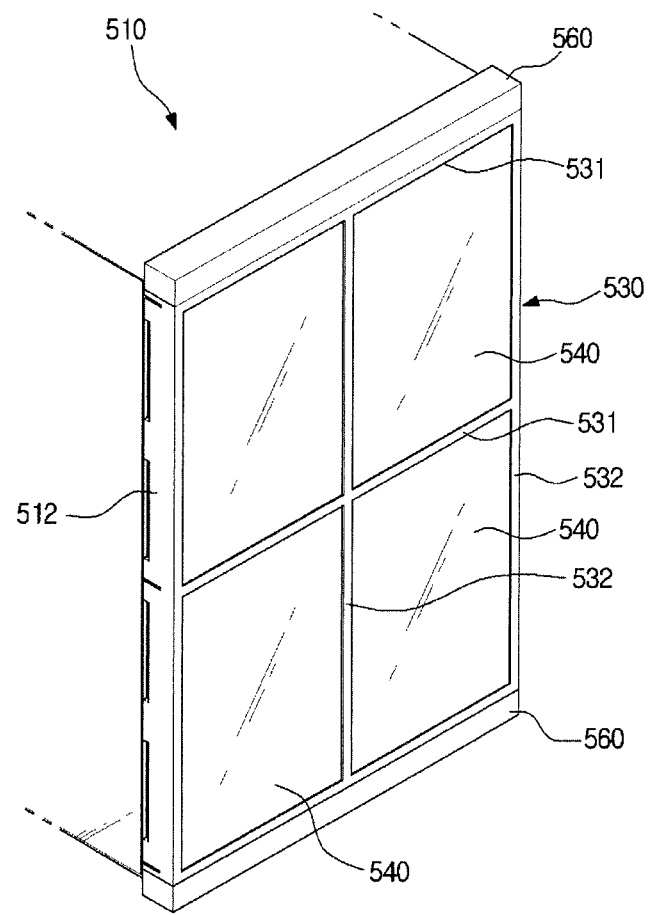
[Fig. 31]

[Fig. 32]
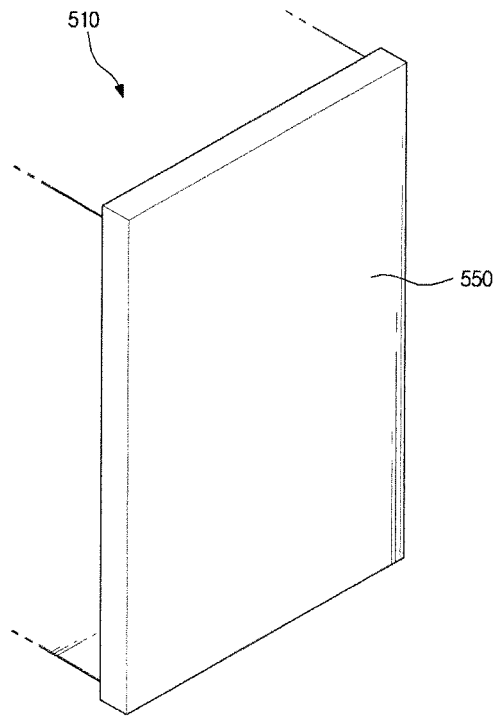
[Fig. 33]
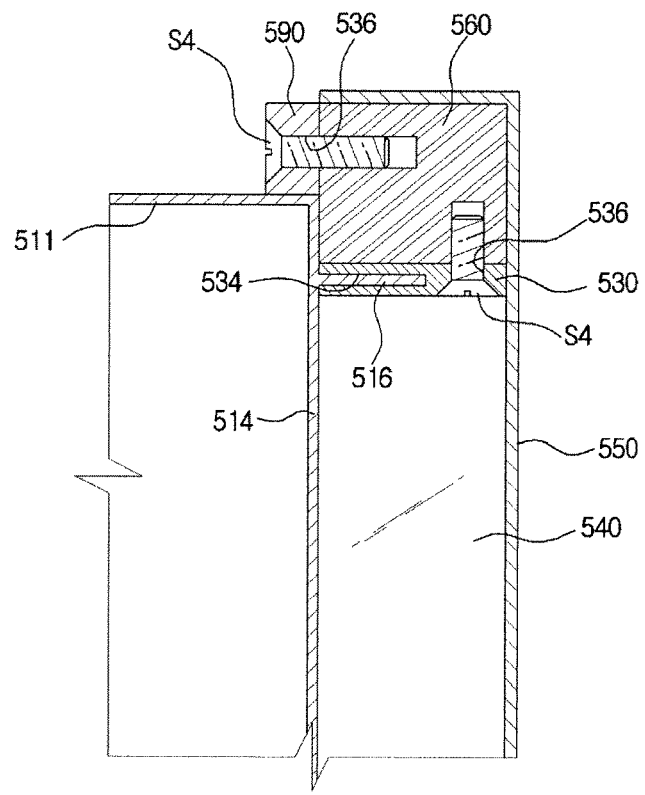

[Fig. 34]
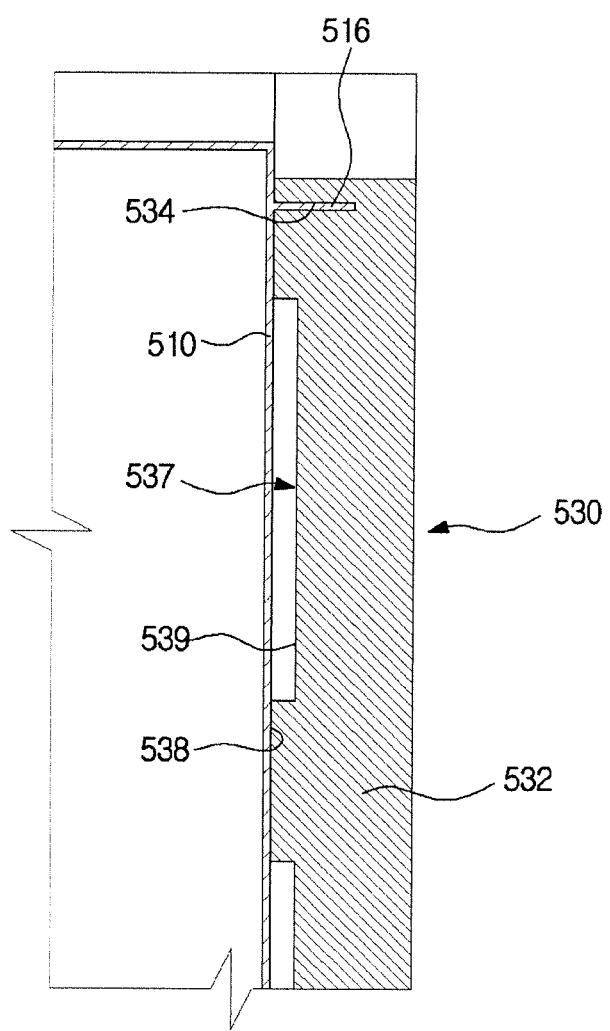

[Fig. 35]
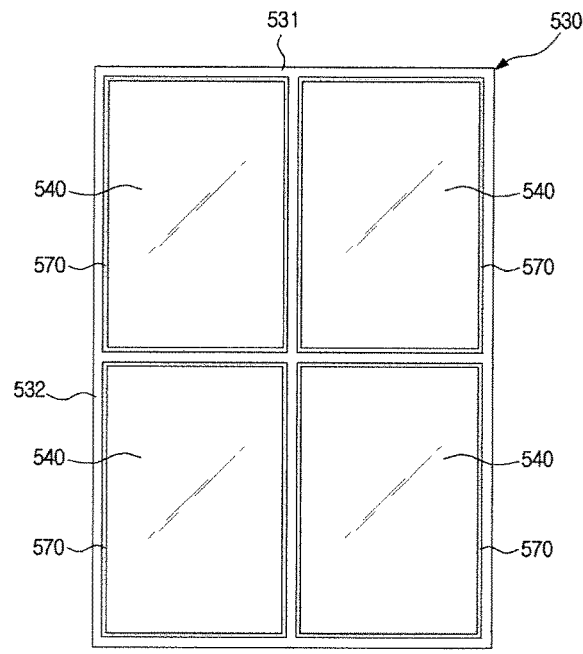
[Fig. 36]
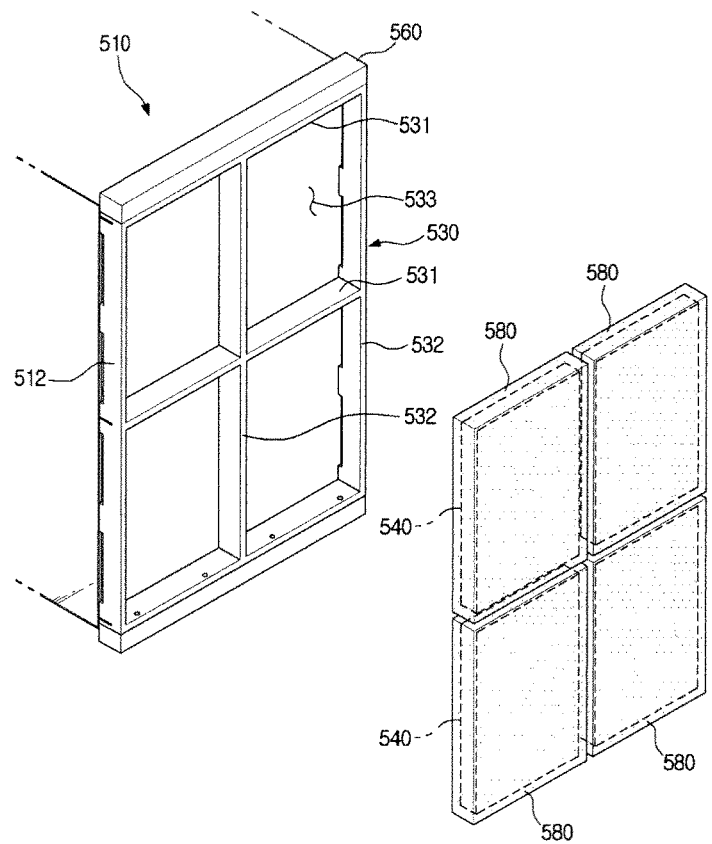

[Fig. 37]
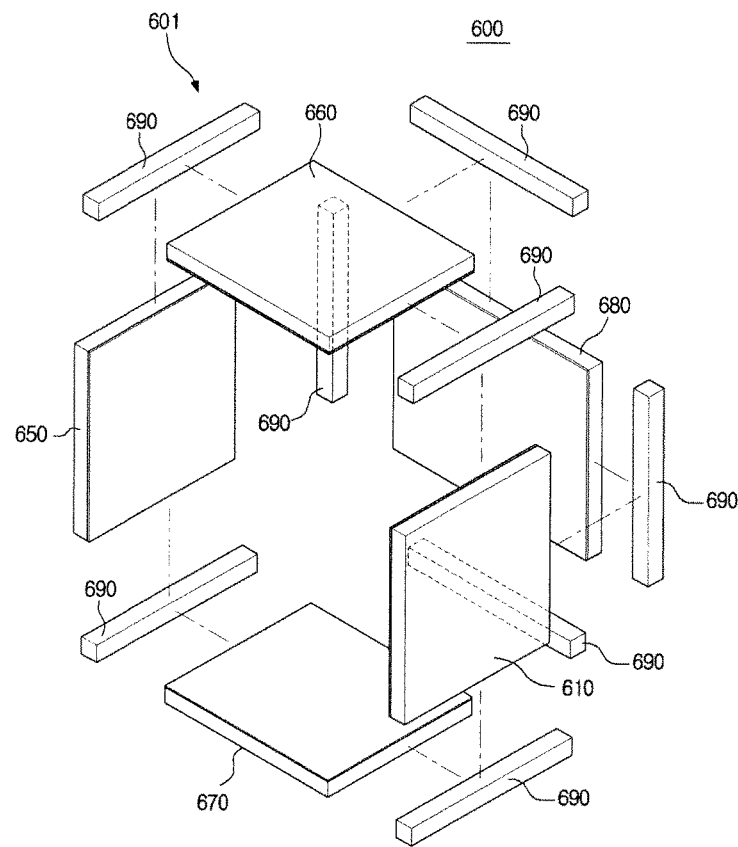
[Fig. 38]
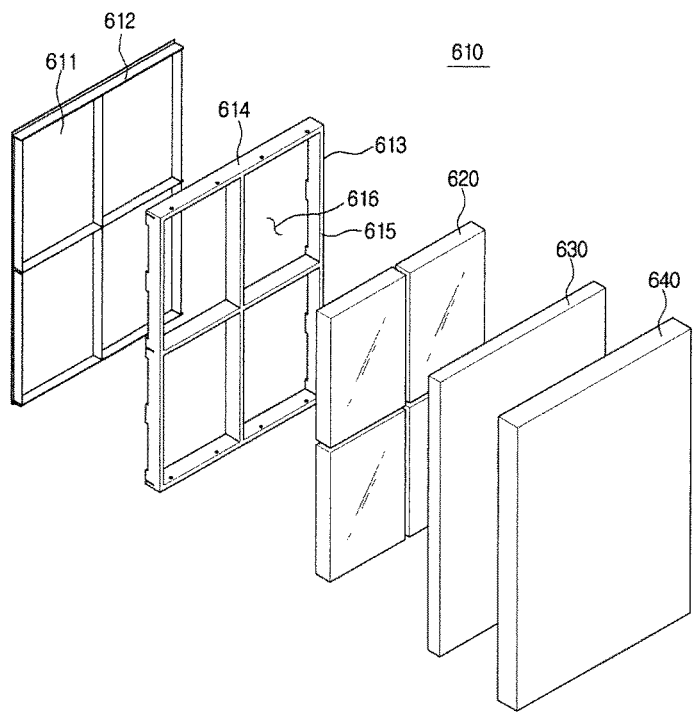

REFRIGERATOR AND VACUUM INSULATION PANEL THEREOF

CROSS-REFERENCE TO RELATED APPLICATIONS

This application is a U.S. National Stage Application, which claims the benefit under 35 U.S.C. § 371 of PCT International Patent Application No. PCT/KR2015/010294, filed Sep. 30, 2015, which claims the foreign priority benefit under 35 U.S.C. § 119 of Korean Patent Application No. 10-2014-0139822 filed Oct. 16, 2014, the contents of which are incorporated herein by reference.

TECHNICAL FIELD

Embodiments of the present invention relate to a refrigerator, and more particularly, to a refrigerator body made of a vacuum insulation panel.

BACKGROUND ART

Generally, a refrigerator is a home appliance having a main body, a storage compartment formed inside the main body, and a cool air supply device for supplying cool air to the storage compartment, and storing food freshly.

The main body of the refrigerator includes an inner case defining a storage compartment, an outer case provided outside the inner case to form an outer appearance, and a heat insulator provided between the inner case and the outer case to insulate the storage compartment, and in general, an urethane foam is used as the heat insulator.

Urethane foam insulation provides sufficient rigidity after foaming and fixes the inner case and outer case by self-adhesive force, so most of the refrigerators on the market use urethane foam insulation.

However, in recent years, in order to improve the heat insulation performance, a vacuum insulation panel composed of an envelope whose inside is sealed with a vacuum and a core material provided inside the envelope is used. However, even in the case of using a vacuum insulation panel, the urethane foam insulation and the vacuum insulation panel are used together to maintain the rigidity and the assemblability, which limits the improvement of heat insulation performance.

DISCLOSURE

Technical Problem

It is an aspect of the present invention to disclose a refrigerator having a body excluding foamed insulation and composed of only vacuum insulation panel.

It is an aspect of the present invention to disclose a vacuum insulation module that protects vacuum insulation panel, maintains rigidity of the refrigerator body, and minimizes cold loss.

Technical Solution

In accordance with one aspect of the present invention, a refrigerator includes an inner case, a storage compartment formed in the inner case, an outer case provided outside the inner case, an inner frame coupled to an outer surface of the inner case to support the inner case, an outer frame coupled to an inner surface of the outer case to support the outer case; and a vacuum insulation panel provided between the inner case and the outer case to insulate the storage compartment and supported by the inner frame and the outer frame.

The inner frame and the outer frame may be mutually supported.

The inner frame may be coupled to an upper wall, a bottom, a left wall, a right wall and a rear wall of the inner case.

The inner case and the inner frame each may include a fastening hole and a fastening member may be fastened to the fastening holes so that the inner case and the inner frame are coupled with each other.

The inner case and the inner frame may be coupled by fitting.

The inner case may include an inner case rail and the inner frame may include a frame rail which is slidably coupled to the inner case rail, and the inner case rail and the frame rail may be slidably coupled with each other so that the inner case and the inner frame are coupled with each other.

The outer frame may include an edge frame positioned at an edge of the outer case, and a face frame positioned on a face of the outer case.

The outer frame may include a connecting member positioned at a vertex of the outer case to couple the edge frames to each other.

The outer frame may include a reinforcing frame provided perpendicularly to the edge frames to connect the edge frames to each other.

The inner frame and the edge frame may be mutually supported.

The inner frame and the face frame may be spaced apart from each other.

When the direction from the inner case to the outer case is referred to as a heat transfer direction, a front end portion and a rear end portion of the inner frame according to the heat transfer direction may have a first area perpendicular to the heat transfer direction, and the inner frame may include a narrow width portion formed between the front end portion and the rear end portion to have a second area smaller than the first area.

The inner frame may include a first support surface and a second support surface which support the vacuum insulation panel and face each other.

At least one of the first support surface and the second support surface may be recessed to form the narrow width portion.

A hollow may be formed between the first support surface and the second support surface to form the narrow width portion.

The refrigerator may further include a cartridge having a bottom, side walls, and an insertion space defined by the bottom and the side walls and into which the vacuum insulation panel is inserted.

In accordance with another aspect of the present invention, a refrigerator includes an inner case, a storage compartment formed inside the inner case, an outer case provided outside the inner case and a vacuum insulation module provided between the inner case and the outer case to insulate the storage compartment, and the vacuum insulation module includes a vacuum insulation panel having an envelope whose inside is sealed in a vacuum state and a core material provided inside the envelop and a cartridge having a bottom, side walls, and an insertion space formed by the bottom and the side walls and into which the vacuum insulation pane is inserted.

The side walls of the cartridge may include openings to reduce heat transfer.

An upper end of the side wall of the cartridge may have a convex portion and a concave portion.

An upper end of the side wall of the cartridge may have a wave shape.

The cartridge may be disposed such that a bottom of the cartridge faces the inner case and an upper end of the side wall of the cartridge faces the outer case.

The cartridge may be disposed such that the upper end of the side wall of the cartridge faces the inner case and the bottom of the cartridge faces the outer case.

The vacuum insulation module may include a filling member filled in a gap between the vacuum insulation panel and the cartridge to seal the gap between the vacuum insulation panel and the cartridge.

The vacuum insulation module may include a molding member surrounding the vacuum insulation panel and the vacuum insulation panel molded by the molding member may be inserted into the insertion space of the cartridge.

The refrigerator may further include an inner frame coupled to an outer surface of the inner case to support the inner case and an outer frame coupled to an inner surface of the outer case to support the outer case, and the vacuum insulation module may be supported by the inner frame and the outer frame.

In accordance with another aspect of the present invention, a vacuum insulation module include a vacuum insulation panel including an envelope whose inside is sealed in a vacuum state and a core material provided inside the envelop and a cartridge having a bottom, side walls, and an insertion space formed by the bottom and the side walls and into which the vacuum insulation panel is inserted.

The side walls of the cartridge may include openings to reduce heat transfer.

An upper end of the side wall of the cartridge may have a convex portion and a concave portion.

An upper end of the side wall of the cartridge may have a wave shape.

The vacuum insulation module may further include a filling member filled in a gap between the vacuum insulation panel and the cartridge to seal the gap between the vacuum insulation panel and the cartridge.

The vacuum insulation module may further include a molding member to mold the vacuum insulation panel so as to surround the vacuum insulation panel and the vacuum insulation panel molded by the molding member may be inserted into the cartridge.

In accordance with another aspect of present invention, a refrigerator includes an inner case, a storage compartment formed in the inner case, an outer case provided outside the inner case, a support frame coupled to an outer surface of the inner case, the support frame having first direction frames and second direction frames arranged in a lattice form and having a mounting space formed between the first direction frames and the second direction frames, and a vacuum insulation panel disposed between the inner case and the outer case to insulate the storage compartment and inserted into the mounting space of the support frame.

The inner frame and the support frame may be coupled by fitting.

The inner case may include a coupling protrusion protruding toward the support frame and the support frame may include a coupling groove into which the coupling protrusion is fitted.

An end portion of the support frame facing the inner case may include a convex portion formed to be convex so as to come into contact with the inner case and a concave portion formed to be concave so as not to contact the inner case.

The inner case may include a top wall, a bottom, a left wall, a right wall, and a rear wall and the refrigerator may further include a connecting member provided at an edge of the inner case to couple the support frames which are respectively coupled to the top wall, the bottom wall, the left wall, the right wall, and the rear wall of the inner case.

The refrigerator may further include a cover member coupled to the outside of the vacuum insulation panel so as to protect the vacuum insulation panel.

The refrigerator may further include a filling member filled between the vacuum insulation panel and the support frame to seal a gap between the vacuum insulation panel and the support frame.

The refrigerator may further include a molding member to mold the vacuum insulation panel so as to surround the vacuum insulation panel and the vacuum insulating panel molded by the molding member may be inserted into the mounting space.

In accordance with another aspect of present invention, a refrigerator may include a main body having a top wall panel, a bottom panel, a left wall panel, a right wall panel, and a rear wall panel, and a storage compartment formed inside the main body, and wherein the top wall panel, the bottom panel, the left wall panel, the right wall panel, and the rear wall panel may be separately provided and assembled together, and wherein the top wall panel, the bottom panel, the left wall panel, the right wall panel, and the rear wall panel each may include an inner case and an outer case provided outside of the inner case and a support frame coupled to an outer surface of the inner case, the support frame having first direction frames and second direction frames arranged in a lattice form and having a mounting space formed between the first direction frames and the second direction frames, and a vacuum insulation panel disposed between the inner case and the outer case to insulate the storage compartment and inserted into the mounting space of the support frame.

The refrigerator may further include a connecting member provided at an edge of the refrigerator to couple the top wall panel, the bottom panel, the left wall panel, the right wall panel, and the rear wall panel.

Advantageous Effects

According to the idea of the present invention, the main body of the refrigerator can be constituted only by the vacuum insulation panel except the urethane foam insulation.

According to the idea of the present invention, since the main body of the refrigerator is constituted only by the vacuum insulating panel excellent in heat insulating performance than the urethane foam insulating material, the heat insulating performance of the refrigerator main body is improved, and it is possible to increase the size of the storage space of the storage compartment by reducing the thickness of the refrigerator body.

According to the idea of the present invention, since the refrigerator body can be constructed without the urethane foaming process, convenience of assembling the refrigerator can be improved.

DESCRIPTION OF DRAWINGS

FIG. 1 is a perspective view showing an appearance of a refrigerator according to a first embodiment of the present invention.

FIG. 2 is an exploded perspective view of a main body of the refrigerator of FIG. 1.

FIG. 3 is a perspective view showing a coupling structure of an inner case and an inner frame of the refrigerator of FIG. 1.

FIG. 4 is a cross-sectional view showing the coupling structure of the inner case and the inner frame of the refrigerator of FIG. 1.

FIG. 5 is a view showing another example of the coupling structure of the inner case and the inner frame of the refrigerator of FIG. 1.

FIG. 6 is a view showing the coupling structure of the inner case and the inner frame according to still another embodiment of the present invention.

FIG. 7 is an exploded perspective view of an outer frame of the refrigerator of FIG. 1.

FIG. 8 is a view showing a coupling structure of the inner case, the inner frame, and a vacuum insulation module of the refrigerator of FIG. 1.

FIG. 9 is a view showing a combined state of the inner case, the inner frame, and the vacuum insulation module of the refrigerator of FIG. 1.

FIG. 10 is a view showing the combined state of the inner case, the inner frame, the vacuum insulation module, and an edge frame of the refrigerator of FIG. 1.

FIG. 11 is a view showing a coupling structure of the edge frame and a face frame of the refrigerator of FIG. 1.

FIG. 12 is a view showing a combined state of the edge frame and the face frame of the refrigerator of FIG. 1.

FIG. 13 is a top cross-sectional view showing the coupling structure of the inner case, the inner frame, the vacuum insulation module, the outer frame, and the outer case of the refrigerator of FIG. 1.

FIG. 14 is an enlarged view of a part 'A' of FIG. 13.

FIG. 15 is a view showing the inner frame of the refrigerator of FIG. 1 according to another embodiment of the present invention.

FIG. 16 is a view showing the inner frame of the refrigerator of FIG. 1 according to still another embodiment of the present invention.

FIG. 17 is an exploded view showing the vacuum insulation module of the refrigerator of FIG. 1.

FIG. 18 is a view showing the structure of the vacuum insulation panel of the refrigerator of FIG. 1.

FIG. 19 is a perspective view showing the vacuum insulation module of the refrigerator of FIG. 1.

FIG. 20 is a top cross-sectional view showing the coupling structure of the vacuum insulation module of the refrigerator of FIG. 1.

FIG. 21 is an enlarged view of a part 'B' of FIG. 20.

FIG. 22 is a view showing another embodiment in which the shape of an opening of a cartridge of the refrigerator of FIG. 1 is changed.

FIG. 23 is a view showing another embodiment in which the shape of an upper end of the cartridge of the refrigerator of FIG. 1 is changed.

FIG. 24 is a view showing another embodiment in which the arrangement of the cartridge of the refrigerator of FIG. 1 is changed.

FIG. 25 is a view showing the vacuum insulation module of the refrigerator of FIG. 1 according to another embodiment of the present invention.

FIG. 26 is a top view showing the vacuum insulation module of FIG. 25.

FIG. 27 is a view showing the vacuum insulation module of the refrigerator of FIG. 1 according to still another embodiment of the present invention.

FIG. 28 is a view showing an example of the SBS (side by side) type refrigerator with the vacuum insulation module of the refrigerator of FIG. 1.

FIG. 29 is an exploded perspective view showing a refrigerator according to a second embodiment of the present invention.

FIG. 30 is a view showing a method for assembling the refrigerator of FIG. 29.

FIG. 31 is another view showing a method for assembling the refrigerator of FIG. 29.

FIG. 32 is still another view showing a method for assembling the refrigerator of FIG. 29.

FIG. 33 is a view showing a structure for minimizing heat transfer of a support frame of the refrigerator of FIG. 29.

FIG. 34 is a view showing a coupling structure of an inner case and the support frame of the refrigerator of FIG. 29.

FIG. 35 is a view showing a filling member filled between the support frame and a vacuum insulation panel of the refrigerator of FIG. 29.

FIG. 36 is a view showing a molding member surrounding the vacuum insulation panel of the refrigerator of FIG. 29.

FIG. 37 is an exploded perspective view showing a refrigerator according to a third embodiment of the present invention.

FIG. 38 is a view showing a structure of a wall panel of the refrigerator of FIG. 37.

MODE FOR INVENTION

Hereinafter, preferred embodiments according to the present invention will be described in detail.

FIG. 1 is a perspective view showing an appearance of a refrigerator according to a first embodiment of the present invention. FIG. 2 is an exploded perspective view of a main body of the refrigerator of FIG. 1.

The refrigerator 1 includes a main body 10 having a storage compartment 2 therein, a door 3 for opening and closing the storage compartment 2, and a cool air supply device (not shown) for supplying cool air to the storage compartment 2.

The main body 10 may have a substantially box shape. The main body 10 includes an inner case 20, an outer case 100 and a thermal insulating material provided between the inner case 20 and the outer case 100 to insulate the storage compartment 2.

The storage compartment 2 is open at the front so that food can be put in and out, and the opened front can be opened and closed by a door 3. The door 3 can be rotatably coupled to the main body 10 by means of a hinge member 4. The door 3 includes a door inner case, a door outer case, and a heat insulating material provided between the door inner case and the door outer case to insulate the storage compartment 2.

The cold air supply device includes a cooling cycle device including a compressor (not shown), a condenser (not shown), an expansion device (not shown), and an evaporator (not shown), a refrigerant pipe (not shown), and a blowing fan (not shown) for forcedly flowing air, so that cool air can be generated and the generated cool air can be supplied to the storage compartment 2.

The main body 10 of the refrigerator 1 may include an inner case 20 forming the storage compartment 2, an outer case 100 provided outside the inner case 20 to form an appearance of the main body 10, a vacuum insulator module 400 provided between the inner case 20 and the outer case 100 to insulate the storage compartment 2, an inner frame 200 coupled to an outer surface of the inner case 20 to support the inner case 20, and an outer frame 300 coupled to an inner surface of the outer case 100 to support the outer case 100.

FIG. 3 is a perspective view showing a coupling structure of an inner case and an inner frame of the refrigerator of FIG. 1. FIG. 4 is a cross-sectional view showing the coupling structure of the inner case and the inner frame of the refrigerator of FIG. 1. FIG. 5 is a view showing another example of the coupling structure of the inner case and the inner frame of the refrigerator of FIG. 1. FIG. 6 is a view showing the coupling structure of the inner case and the inner frame according to still another embodiment of the present invention.

The inner case 20 may have a box shape whose front is open. A storage compartment 2 may be formed inside the inner case 20. A machine room in which a compressor (not shown) or the like may be disposed may be formed at a rear lower portion of the inner case 20.

The inner case 20 may have a top wall 21, a bottom 22, a left wall 23, a right wall 24, and a rear wall 25. The inner case 20 can be formed by vacuum molding or injection molding with a resin material. The outer case 100 is provided to surround the inner surface 20 and may be formed of a metal material.

The inner frame 200 is coupled to the outer surface of the inner case 20 and reinforces the strength of the inner case 20 to prevent sagging or deformation of the inner case 20. In addition, the inner frame 200 may support the vacuum insulator module 400. The inner frame 200 may have a substantially bar shape and a separate inner frame 200 may be coupled to the top wall 21, the bottom 22, the left wall 23, the right wall 24, and the rear wall 25 of the inner case 20, respectively.

The inner frame 200 can be coupled to the inner case 20 by various coupling methods.

For example, as shown in FIG. 4, the inner case 20 and the inner frame 200 may be coupled through separate fastening members such as screws. For this, the inner case 20 and the inner frame 200 are provided with fastening holes 31 and 201 for fastening the fastening members S1, respectively. The fastening member S1 are fastened to the fastening holes 31 and 201 and the inner case 20 and the inner frame 200 can be firmly coupled.

As shown in FIG. 5, the inner case 20 and the inner frame 200 may be coupled by a fitting method. For this, a coupling protrusion 32 is formed on the inner case 20, and a coupling groove 202 is formed on the inner frame 200, to which the coupling protrusion 32 is fitted. It is needless to say that a coupling groove may be formed in the inner case 20 and a coupling protrusion may be formed in the inner frame 200.

As shown in FIG. 6, the inner case 20 and the inner frame 200 may be coupled by a sliding coupling method. For this, an inner case rail 33 may be formed in the inner case 20, and a frame rail 203 to which the inner case rail 33 is slidably coupled may be formed in the inner frame 200.

The inner frame 200 can be coupled to the inner case 20 through various methods other than the above-described coupling method.

The inner frame 200 may come in contact with and be supported by an edge frame 310 of the outer frame 300 but may be spaced apart without contacting a face frame 320 of the outer frame 300 (FIGS. 7, 11, and 14). The inner frame 200 is in contact with the edge frame 310 of the outer frame 300 so that the inner frame 200 and the outer frame 300 are firmly supported by each other and the inner frame 200 is spaced apart from the face frame 320 of the outer frame 300 in order to reduce heat loss through heat transfer. The face frame 320 and the edge frame 310 of the outer frame 300 will be described later.

This inner frame 200 may be formed of a steel material or a stainless steel (SUS) material. Alternatively, the inner frame 200 may be formed of a polycarbonate (PC) material, a polystyrene (PS) material, or an engineering plastic material such as a polyphenylene sulfide (PPS) material.

FIG. 7 is an exploded perspective view of an outer frame of the refrigerator of FIG. 1. FIG. 8 is a view showing a coupling structure of the inner case, the inner frame, and a vacuum insulation module of the refrigerator of FIG. 1. FIG. 9 is a view showing a combined state of the inner case, the inner frame, and the vacuum insulation module of the refrigerator of FIG. 1. FIG. 10 is a view showing the combined state of the inner case, the inner frame, the vacuum insulation module, and an edge frame of the refrigerator of FIG. 1. FIG. 11 is a view showing a coupling structure of the edge frame and a face frame of the refrigerator of FIG. 1. FIG. 12 is a view showing a combined state of the edge frame and the face frame of the refrigerator of FIG. 1.

The outer frame 300 is coupled to the inner surface of the outer case 100 to reinforce the strength of the outer case 100. The outer frame 300 and the outer case 100 can be firmly coupled by a separate fastening member such as a screw. In addition, the outer frame 300 supports the inner frame 200 and can protect and support the vacuum insulator module 400.

As shown in FIG. 7, the outer frame 300 may include the edge frame 310 positioned at the edge of the outer case 100 and the face frame 320 positioned at the face of the outer case 100.

The outer frame 300 may include a plurality of edge frames 310. Each edge frame 310 has a substantially bar shape and may be positioned at each edge of the outer case 100. The outer frame 300 may further include a connecting member 330 positioned at the vertex of the outer case 100 to couple the edge frames 310 together. The edge frames 310 may be coupled through the connecting member 330 to have a frame shape.

The outer frame 300 may further include a reinforcing frame 340 provided perpendicularly to the edge frames 310 to connect the edge frames 310 to each other and reinforce the strength.

The outer frame 300 may have a plurality of face frames 320. Each face frame 320 may correspond to each face of the main body 10. The face frame 320 may have a lattice shape as in the present embodiment, or may simply have a planar shape.

As shown in FIG. 11, the edge frame 310 and the face frame 320 can be firmly coupled through separate fastening members S2 such as screws. The edge frame 310 and the face frame 320 are provided with fastening holes 311 and 321 and the fastening member S2 is fastened to the fastening holes 311 and 321.

This outer frame 300 may be formed of a steel material or a stainless steel (SUS) material. Or the outer frame 300 may be formed of a polycarbonate (PC) material, a polystyrene (PS) material, or an engineering plastic material such as a polyphenylene sulfide (PPS) material.

Referring to FIGS. 3 to 12, a process of assembling the main body of the refrigerator according to the embodiment of the present invention will be described.

As shown in FIG. 3, the inner frame 200 is coupled on the outer surface of the inner case 20. As described above, the inner frame 200 can be coupled to the inner case 20 in various ways.

After the coupling of the inner frame 200 is completed, the vacuum insulator module 400 is aligned with the outer surface of the inner case 20 as shown in FIG. 8. During alignment of the vacuum insulator module 400, an inner frame 200 coupled to the inner case 20 may guide the position of the vacuum insulator module 400. After alignment, the vacuum insulator module 400 can be temporarily fixed to the inner case 20 through an adhesive member such as a double-sided adhesive tape.

When the vacuum insulator module 400 is aligned with the outer surface of the inner case 20, a clearance C is formed in the vicinity of an edge as shown in FIG. 9. The edge frame 310 of the outer frame 300 is engaged with the clearance space C as shown in FIG. 10.

Next, the face frame 320 of the outer frame 301 is coupled to the edge frame 310 of the outer frame 300, as shown in FIG. 11. Finally, the outer frame 300 is covered with the outer case 100, and then the outer frame 300 is fastened with the fastening member.

FIG. 13 is a top cross-sectional view showing the coupling structure of the inner case, the inner frame, the vacuum insulation module, the outer frame, and the outer case of the refrigerator of FIG. 1. FIG. 14 is an enlarged view of a part 'A' of FIG. 13. FIG. 15 is a view showing the inner frame of the refrigerator of FIG. 1 according to another embodiment of the present invention. FIG. 16 is a view showing the inner frame of the refrigerator of FIG. 1 according to still another embodiment of the present invention.

As shown is FIG. 14, when the direction from the inner case 20 toward the outer case 100 is referred to as a heat transfer direction H, a front end portion 211 of the inner frame 200 along the heat transfer direction H comes into contact with the inner case 20. On the other hand, a rear end 212 of the inner frame 200 may be spaced a predetermined distance G from the face frame 320 of the outer frame 300. As described above, this is to reduce the loss of cool air in the storage compartment due to the inner frame 200 acting as a heat bridge.

However, unlike the present embodiment, the rear end portion 212 of the inner frame 200 comes in contact with the face frame 320 of the outer frame 300, so that the stiffness of the body can be increased.

The front end portion 211 and the rear end portion 212 of the inner frame 200 may have a first area perpendicular to the heat transfer direction H, respectively. The inner frame 200 may have a narrow width portion 213 formed between the front end portion 211 and the rear end portion 212 to have a second area smaller than the first area.

The narrow width portion 213 has the second area smaller than the first area, so that the heat transfer between the front end portion 211 and the rear end portion 212 can be reduced.

The inner frame 200 may have a first support surface 214 and a second support surface 217 which are disposed to face each other between the front end 211 and the rear end 212 and provided to support the vacuum insulation module 400.

The narrow width portion 213 may be formed by sinking any one of the first support surface 214 and the second support surface 217. For example, the first support surface 214 may be recessed to form the narrow width portion 213 as in the present embodiment. That is, the first support surface 214 may include a recessed surface 215 and a recessed space 216 formed by the recessed surface 215. In this embodiment, the recessed surface 215 is formed to have a substantially "[" shape, but is not limited thereto.

As another example, as shown in FIG. 15, the narrow width portion 223 may be formed by sinking both the first support surface 224 and the second support surface 227 together. That is, the first support surface 224 may include a recessed surface 225 and a recessed space 226 defined by the recessed surface 225. The second support surface 227 may include a recessed surface 228 and a recessed space 229 defined by the recessed surface 228. The narrow width portion 223 may be formed between the recessed surface 225 and the recessed surface 228.

As still another example, as shown in FIG. 16, the narrow width portion 233 may be formed by forming a hollow 236 between the first support surface 234 and the second support surface 235. In this case, the narrowed width portion 233 may be formed between the first support surface 234 and the hollow 236 and between the second support surface 235 and the hollow 236.

In FIGS. 14 to 16, reference numeral 400 is a vacuum insulator module, 410 is vacuum insulation panel, 420 is a cartridge, 421 is the bottom of the cartridge, 422 is the cartridge sidewall, and 428 is the opening of the cartridge sidewall. The vacuum insulator module 400 and the cartridge 420 will be described later.

FIG. 17 is an exploded view showing the vacuum insulation module of the refrigerator of FIG. 1. FIG. 18 is a view showing the structure of the vacuum insulation panel of the refrigerator of FIG. 1. FIG. 19 is a perspective view showing the vacuum insulation module of the refrigerator of FIG. 1. FIG. 20 is a top cross-sectional view showing the coupling structure of the vacuum insulation module of the refrigerator of FIG. 1. FIG. 21 is an enlarged view of a part 'B' of FIG. 20. FIG. 22 is a view showing another embodiment in which the shape of an opening of a cartridge of the refrigerator of FIG. 1 is changed. FIG. 23 is a view showing another embodiment in which the shape of an upper end of the cartridge of the refrigerator of FIG. 1 is changed. FIG. 24 is a view showing another embodiment in which the arrangement of the cartridge of the refrigerator of FIG. 1 is changed.

The vacuum insulation module 400 may include a vacuum insulation panel 410 and a cartridge 420 into which the vacuum insulation panel 410 is inserted.

As illustrated in FIG. 18, the vacuum insulation panel 410 may include an envelope 411 whose inside is sealed in a vacuum state and a core material 412 which is provided inside the envelope 411 and holds the atmospheric pressure. As the core material 412, fumed silica or glass fiber having good durability and low thermal conductivity may be used. The envelope 411 may be an evaporation material or an aluminum foil on which a metal or an inorganic material having low permeability to gas and moisture is deposited.

The vacuum insulation panel 410 may further include an adsorbent 413 that adsorbs gas and moisture in the envelope 411 to maintain the vacuum state for a long time. As the adsorbent 413, calcium oxide (CaO) or the like may be used.

As illustrated in FIG. 17, the cartridge 420 includes a bottom 412, a side wall 422, and an insertion space 427 formed by the bottom 412 and the side wall 422. The vacuum insulation panel 410 may be inserted into the insertion space 427. The side wall 422 may include a front wall 423, a rear wall 424, a left wall 425, and a right wall 426. The upper surface of the cartridge 420 is opened and the vacuum insulation panel 410 can be inserted through the opened upper surface. The Cartridge 420 may further include a cover 456 (FIG. 25) that closes the open top surface.

With this configuration, the cartridge 420 can protect the vacuum insulation panel 410 from an external force. Further, the cartridge 420 itself may perform the function of reinforcing the rigidity of the main body 10.

The side wall 422 of the cartridge 420 may be provided with an opening 428 to reduce the heat bridge action of the cartridge 420. The opening 428 may have a circular shape. However, the shape of the opening 428 is not limited thereto. For example, as shown in FIG. 22, the opening 432 may have a rectangular shape or other polygonal shapes.

The upper end 429 of the side wall 422 of the cartridge 420 is not flat and can be formed to be bent. The upper end portion 429 of the side wall 422 of the cartridge 420 may include a concave portion 431 formed concavely and the convex portion 430 formed to be convex upward. Specifically, the upper end 429 of the side wall 422 of the cartridge 420 may have a wave shape. The wave shape may include a shape such as a sinusoidal curve.

This shape of the cartridge 420 is to reduce the contact area between the upper end 429 of the side wall 422 of the cartridge 420 and the refrigerator body 10 to reduce heat transfer. This is because the upper end portion 429 of the side wall 422 of the cartridge 420 can make a point contact with the refrigerator body 10 if the upper end portion 429 of the side wall 422 of the cartridge 420 has a wave shape.

The shape of the upper end of the side wall 422 of the cartridge 420 is not limited to the wave shape, but it is sufficient to have the convex portion and the concave portion. As illustrated in FIG. 23, the upper end portion 441 of the side wall 422 of the cartridge 420 may have a rectangular convex portion 442 and a concave portion 443.

As shown in FIG. 21, the vacuum insulation module 400 is conFIGured such that the bottom 421 of the cartridge 420 faces toward the inner case 20 and the upper end 429 of the side wall of the cartridge 420 faces toward the outer case 100.

However, the present invention is not limited to this arrangement. As shown in FIG. 24, the vacuum insulation module 400 may be arranged such that the upper end 429 of the side wall of the cartridge 420 faces toward the inner case 20 and the bottom 421 of the cartridge 420 faces toward the outer case 100.

FIG. 25 is a view showing the vacuum insulation module of the refrigerator of FIG. 1 according to another embodiment of the present invention. FIG. 26 is a top view showing the vacuum insulation module of FIG. 25.

A vacuum insulation module 450 may include a vacuum insulation panel 451 and, a cartridge 452 having a bottom 453 and side walls 454 and an insertion space 455 into which the vacuum insulation panel 451 is inserted, and a filling member 457 filled in the gap between the vacuum insulation panel 451 inserted into the insertion space 455 and the cartridge 452.

The cartridge 452 has an upper surface that is open for inserting the vacuum insulation panel 451 and the cartridge 452 may further include a cover 456 that closes the opened upper surface.

The filling member 457 can be filled in the gap between the vacuum insulation panel 451 and the cartridge 452 after inserting the vacuum insulation panel 451 into the inserting space 455 of the cartridge 452 and closing the cover 456.

The filling member 457 is filled in the gap between the vacuum insulation panel 451 and the cartridge 452 so that the vacuum insulator module 450 can be improved in the heat insulation performance and reinforced in strength.

For this purpose, silica (SiO 2), air gel, polyurethane or the like may be used as the filling member 457, which has a smaller heat transfer coefficient than air. The filling member 457 can be filled in the form of a nano powder so as to fill a narrow gap between the vacuum insulation panel 451 and the cartridge 452.

FIG. 27 is a view showing the vacuum insulation module of the refrigerator of FIG. 1 according to still another embodiment of the present invention.

The vacuum insulation module 450 may include a vacuum insulation panel 461, a molding member 462 surrounding the vacuum insulation panel 461, and a cartridge 463. The cartridge 463 has a bottom 464, and side walls 465, and an insertion space 466 into which the vacuum insulation panel 461 molded by molding member 462 is inserted.

The molding member 462 can protect the vacuum insulation panel 461. The molding member 462 may be a resin such as PVC and the vacuum insulation panel 461 may be molded in whole or in part. A molding die for molding the vacuum insulation panel 461 is provided so as to coincide with the size of the insertion space 466 of the cartridge 463 so that the molded vacuum insulation 461 is inserted into the insertion space 466 of the cartridge 463 without a gap.

FIG. 28 is a view showing an example of the SBS (side by side) type refrigerator with the vacuum insulation module of the refrigerator of FIG. 1.

It is needless to say that the thermal insulation structure of the main body using the vacuum insulation module according to the present embodiment is applicable not only to a refrigerator having only one storage compartment but also to a refrigerator having a plurality of storage compartments.

That is, the thermal insulation structure of the main body using the vacuum insulation module according to the present embodiment is applicable to a side by side (SBS) type refrigerator in which a left storage compartment and a right storage compartment are divided by a vertical partition wall, and is applicable to a top mounted freezer (TMF) type, Bottom Mounted Freezer (BMF) type, and French Door Refrigerator (FDR) type refrigerator in which the upper storage compartment and the lower storage compartment are divided by a horizontal partition wall.

For example, as illustrated in FIG. 28, a refrigerator 470 may include an inner case 474 forming a first storage compartment 471 on the left side and a second storage compartment 472 on the right side, and an outer case 475 surrounding the inner case 474 and forming an outer appearance, and an inner frame 480 coupled to the outer surface of the inner case 474 to reinforce the strength of the inner case 474 and to support a vacuum insulation module 490, and an outer frame 485 coupled to the inner surface of the outer case 475 to reinforce the strength of the outer case 475 and to support the vacuum insulation module 490.

The first storage compartment 471 and the second storage compartment 472 may be used as a refrigerator compartment or a freezer compartment, respectively, and may be partitioned by a vertical partition wall 473. The first storage compartment 471 and the second storage compartment 472 may be opened on the front so that food can be put in and out, respectively, and the open front can be opened and closed by a first door 498 and a second door 499, respectively.

FIG. 29 is an exploded perspective view showing a refrigerator according to a second embodiment of the present invention. FIG. 30 is a view showing a method for assembling the refrigerator of FIG. 29. FIG. 31 is another view showing a method for assembling the refrigerator of FIG. 29. FIG. 32 is still another view showing a method for assembling the refrigerator of FIG. 29. FIG. 33 is a view showing a structure for minimizing heat transfer of a support frame of the refrigerator of FIG. 29. FIG. 34 is a view showing a coupling structure of an inner case and the support frame of the refrigerator of FIG. 29. FIG. 35 is a view showing a filling member filled between the support frame and a vacuum insulation panel of the refrigerator of FIG. 29. FIG. 36 is a view showing a molding member surrounding the vacuum insulation panel of the refrigerator of FIG. 29.

Referring to FIGS. 29 to 36, a refrigerator according to a second embodiment of the present invention will be described.

A refrigerator 500 includes a main body 501, a storage compartment 502 formed inside the main body 501, a door (not shown) for opening and closing the storage compartment 502, and a cold air supply device for supplying cold air to the storage compartment 502.

The main body 501 may include an inner case 510 forming a storage compartment 502, an outer case 520 provided outside the inner case 510, a support frame 530 coupled to the outer surface of the inner case 510, a vacuum insulation panel 540 provided between the inner case 510 and the outer case 520 to insulate the storage compartment 502, and a cover 550 coupled to the outside of the vacuum insulation panel 540 to protect the vacuum insulation panel 540.

The inner case 510 may have a substantially box shape with an open front. The inner case 510 may have a top wall 511, a bottom 512, a left wall 513, a right wall 514 and a rear wall 515.

The support frame 530, the vacuum insulator 540 and the cover 550 may be provided at the upper wall 511, the bottom 512, the left wall 513, the right wall 514, and the rear wall 515, respectively. But, FIG. 28 shows only the support frame 530, the vacuum insulator 540 and the cover 550 which are provided on the right wall 514 of the inner case 510.

The support frame 530 includes first direction frames 531 and second direction frames 532 and the first direction frames 531 and second direction frames 532 are arranged in a lattice shape. Therefore, a mounting space 533 may be formed between the first direction frames 531 and the second direction frames 532. The mounting space 533 may be equipped with a vacuum insulation panel 540. The first direction frames 531 and the second direction frames 532 may be integrally formed.

In the present embodiment, the first direction frames 531 extend in the transverse direction and the second direction frames 532 extend in the longitudinal direction. However, the present invention is not limited thereto, and it is sufficient that the first direction frames 531 and the second direction frames 532 are arranged to intersect with each other. In one example, the first direction frames 531 and the second direction frames 532 may extend obliquely.

The support frame 530 can be coupled to the inner case 510 in a variety of ways. For example, the inner case 510 and the support frame 530 may be engaged in a fitting manner as in the present embodiment. A coupling protrusion 516 protruding toward the support frame 530 may be formed in the inner case 510 and a coupling groove 534 530 to which the coupling protrusion 516 is fitted in a fitting manner may be formed in the support frame. In addition to such a fitting method, it can be combined by various methods such as a method using a fastening member such as a screw or a sliding method using a rail.

As shown in FIG. 33, an end portion 537 of the support frame 530 on the inner case 510 side may include a convex portion 538 convexly formed to be in contact with the inner case 510, and may include a concave portion 539 formed to be concave so as not to contact the inner case 510. With this structure, the contact area between the support frame 530 and the inner case 510 is reduced, and heat transfer can be reduced.

Referring to FIGS. 30 to 33, a process of assembling the main body of the refrigerator according to the embodiment of the present invention will be described.

First, as shown in FIG. 30, the support frame 530 is engaged with the outer surface of the inner case 514. The inner case 514 and the support frame 530 can be joined together in a fitting manner or in various other ways as described above.

When the engagement of the support frame 530 with the inner case 514 is completed, the vacuum insulation panel 540 is mounted in the mounting space 533 of the support frame 530 as shown in FIG. 31. The vacuum insulation panel 540 can be temporarily fixed to the inner case 514 by using an adhesive member such as a double-sided adhesive tape.

When the vacuum insulation panel 540 is coupled, a cover 550 is coupled to the outside of the vacuum insulation panel 540 as shown in FIG. 32.

In this way, the support frame 530 and the vacuum insulation panel 540 are attached to the upper wall 511, the bottom 512, the left wall 513, the right wall 514 and the rear wall 515 of the inner case 510.

Meanwhile, the support frames 530 which are coupled respectively to the upper wall 511, the bottom wall 512, the left wall 513, the right wall 514 and the rear wall 515 of the inner case 510 can be coupled each other by a connecting member 560.

For example, as shown in FIG. 34, the support frame 530 coupled to the right wall 514 of the inner case 510 and the connecting member 560 are fastened by separate fastening members S4, and the support frame 590 coupled to the upper wall 511 of the inner case 510 may be fastened to the support frame 560 by the separate fastening member S4.

As shown in FIG. 35, a filling member 570 may be filled between the vacuum insulation panel 540 and the support frame 530 to seal the gap between the vacuum insulation panel 540 and the support frame 530.

Further, as show in FIG. 36, the vacuum insulation panel 540 can be inserted into the mounting space 533 of the support frame 530 after being molded by a molding member 580.

According to the second embodiment, since the vacuum insulation panel is fixed and supported by one support frame rather than by a plurality of frame structures of the inner frame and the outer frame of the first embodiment, the assembly is simplified.

It should be noted that the heat insulating structure of the main body using the vacuum insulation panel according to the second embodiment is applicable not only to a refrigerator having one storage compartment but also to a refrigerator having a plurality of storage compartments.

FIG. 37 is an exploded perspective view showing a refrigerator according to a third embodiment of the present invention. FIG. 38 is a view showing a structure of a wall panel of the refrigerator of FIG. 37.

A refrigerator 600 may have a body 601 having a top wall panel 660, a bottom panel 670, a left wall panel 650, a right wall panel 640 and a rear wall panel 680. The upper wall panel 660, the lower wall panel 670, the left wall panel 650, the right wall panel 640 and the rear wall panel 680 are separately provided and can be assembled with each other by a connecting member 690.

Only the constitution of the right wall panel 640 will be described because the constitution of each wall body is the same. The right wall panel 640 may include an inner case 611, an outer case 640 provided outside the inner case 611, a support frame 613 coupled to the outer surface of the inner case 611 and provided with a mounting space 615, a vacuum insulation panel 620 inserted into the mounting space 615 and a cover 630 coupled to the outside of the vacuum insulation panel 620.

The support frame 613 has first direction frames 614 and second direction frames 615 that are arranged in a lattice shape and a mounting space 615 may be formed between the first direction frames 614 and the second direction frames 615.

According to the third embodiment, unlike the second embodiment, since the wall panels of the refrigerator are independently manufactured and then coupled to each other, the wall panels of the refrigerator can be assembled more easily.

It should be noted that the heat insulating structure of the main body using the vacuum insulation panel according to the third embodiment is applicable not only to a refrigerator having one storage compartment but also to a refrigerator having a plurality of storage compartments.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A refrigerator comprising:
   an inner case;
   a storage compartment formed in the inner case;
   an outer case provided outside the inner case;
   an inner frame coupled to an outer surface of the inner case to support the inner case;
   an outer frame coupled to an inner surface of the outer case to support the outer case; and
   a plurality of vacuum insulation panels provided between the inner case and the outer case to insulate the storage compartment and supported by the inner frame and the outer frame, wherein
      each of the plurality of vacuum insulation panels includes a vacuum sealed envelope and a core material provided in the envelope, and
      the inner frame comprises a plurality of bar members configured to receive the plurality of vacuum insulation panels therebetween to align the plurality of vacuum insulation panels with the outer surface of the inner case.

2. The refrigerator according to claim 1,
   wherein the inner frame and the outer frame are mutually supported.

3. The refrigerator according to claim 1,
   wherein the inner frame is coupled to an upper wall, a bottom, a left wall, a right wall and a rear wall of the inner case.

4. The refrigerator according to claim 1,
   wherein the inner case and the inner frame each include a fastening hole, and
   wherein a fastening member is fastened to the fastening holes so that the inner case and the inner frame are coupled with each other.

5. The refrigerator according to claim 1,
   wherein the inner case and the inner frame are coupled by fitting.

6. The refrigerator according to claim 1,
   wherein the inner case comprises an inner case rail,
   wherein the inner frame comprises a frame rail which is slidaby coupled to the inner case rail, and
   wherein the inner case rail and the frame rail are slidably coupled with each other so that the inner case and the inner frame are coupled with each other.

7. The refrigerator according to claim 1, wherein
   the outer frame comprises an edge frame positioned at an edge of the outer case, and a face frame positioned on a face of the outer case,
   a connecting member positioned at a vertex of the outer case to couple the edge frames to each other, and
   a reinforcing frame provided perpendicularly to the edge frames to connect the edge frames to each other.

8. The refrigerator according to claim 7,
   wherein the inner frame and the edge frame are mutually supported.

9. The refrigerator according to claim 7,
   wherein the inner frame and the face frame are spaced apart from each other.

10. The refrigerator according to claim 1,
    wherein when the direction from the inner case to the outer case is referred to as a heat transfer direction, a front end portion and a rear end portion of the inner frame according to the heat transfer direction have a first area perpendicular to the heat transfer direction, and
    wherein the inner frame comprises a narrow width portion formed between the front end portion and the rear end portion to have a second area smaller than the first area.

11. The refrigerator according to claim 10,
    wherein the plurality of bar members of the inner frame comprises a first support surface and a second support surface which support the vacuum insulation panel and face each other.

12. The refrigerator according to claim 11,
    wherein at least one of the first support surface and the second support surface is recessed to form the narrow width portion.

13. The refrigerator according to claim 11,
    wherein a hollow is formed between the first support surface and the second support surface to form the narrow width portion.

\* \* \* \* \*

UNITED STATES PATENT AND TRADEMARK OFFICE
CERTIFICATE OF CORRECTION

PATENT NO. : 10,274,247 B2  
APPLICATION NO. : 15/519641  
DATED : April 30, 2019  
INVENTOR(S) : Hyun Ku Jeong et al.

Page 1 of 1

It is certified that error appears in the above-identified patent and that said Letters Patent is hereby corrected as shown below:

In the Claims

In Column 16, Line 13:
In Claim 6, delete "slidaby" and insert -- slidably --, therefor.

Signed and Sealed this
Twenty-fifth Day of June, 2019

Andrei Iancu
*Director of the United States Patent and Trademark Office*